US011531118B2

(12) United States Patent
Fattouch et al.

(10) Patent No.: US 11,531,118 B2
(45) Date of Patent: Dec. 20, 2022

(54) GNSS SIGNAL MODELING

(71) Applicant: Google LLC, Mountain View, CA (US)

(72) Inventors: Imad Jean Fattouch, Mountain View, CA (US); Arastoo Zabolestani Moradi, Rancho Santa Margarita, CA (US); Frank Van Diggelen, Carmel-by-the-Sea, CA (US); Zifei Tong, Santa Clara, CA (US); Mohammed Khider, Mountain View, CA (US); Stefano Maggiolo, London (GB); David Orendorff, Costa Mesa, CA (US)

(73) Assignee: Google LLC, Mountain View, CA (US)

( * ) Notice: Subject to any disclaimer, the term of this patent is extended or adjusted under 35 U.S.C. 154(b) by 304 days.

(21) Appl. No.: 17/008,897

(22) Filed: Sep. 1, 2020

(65) Prior Publication Data

US 2022/0066040 A1    Mar. 3, 2022

(51) Int. Cl.
| | |
|---|---|
| *G01S 19/22* | (2010.01) |
| *G01S 19/37* | (2010.01) |
| *G01S 19/39* | (2010.01) |
| *H04W 4/029* | (2018.01) |
| *G01S 19/06* | (2010.01) |
| *G01S 19/24* | (2010.01) |

(52) U.S. Cl.
CPC .............. *G01S 19/22* (2013.01); *G01S 19/06* (2013.01); *G01S 19/24* (2013.01); *G01S 19/37* (2013.01); *G01S 19/396* (2019.08); *H04W 4/029* (2018.02)

(58) Field of Classification Search
CPC ........ G01S 19/22; G01S 19/37; G01S 19/396; G01S 19/24; H04W 4/029
USPC ......................................................... 342/352
See application file for complete search history.

(56) References Cited

U.S. PATENT DOCUMENTS

| | | | |
|---|---|---|---|
| 2014/0171105 A1* | 6/2014 | Al-Mufti ............... | G01S 5/0221 455/456.1 |
| 2019/0204429 A1* | 7/2019 | Booij ....................... | G01S 11/14 |

FOREIGN PATENT DOCUMENTS

EP                 2634599 A1 *  9/2013  ............. G01S 19/28

* cited by examiner

*Primary Examiner* — Harry K Liu
(74) *Attorney, Agent, or Firm* — Honigman LLP; Brett A. Krueger

(57) ABSTRACT

A method of processing signal paths includes receiving an estimated location for a GNSS receiver in an environment. The method also includes generating a plurality of candidate positions about the estimated location where each candidate position corresponds to a possible actual location of the GNSS receiver. The method further includes, for each available satellite at each candidate position, modeling a plurality of candidate signal paths by ray-launching a raster map of geographical data Here, the plurality of candidate signal paths includes one or more reflected signal paths. At each candidate position, the method also includes comparing, the plurality of candidate signal paths modeled for each available satellite at the respective candidate position to measured GNSS signal data from the GNSS receiver and generating a likelihood that the respective candidate position includes the actual location of the GNSS receiver based on the comparison.

28 Claims, 14 Drawing Sheets

GNSS SIGNAL MODELING

TECHNICAL FIELD

This disclosure relates to excess path length calculation processing.

BACKGROUND

Global Navigation Satellite Systems (GNSS) use radio signals transmitted by orbiting satellites to determine precise ground locations, enabling advanced navigation and location-based services. Typically, a GNSS receiver receives one or more radio signals transmitted by the orbiting satellites and the GNSS receiver, or a locational system associated with the GNSS receiver, is able to determine the position of the GNSS receiver based on the timing of messages received from satellites) (e.g., often at least, four satellites). Each message specifies the time of transmission and the position of the satellite at the time of transmission. The receiver or the locational system can compute the time of transit for each received message and often, using navigation equations, the location of the receiver. The location of the receiver may then be utilized by various applications ranging from telecommunication to navigation. As the number of applications that incorporate some aspect of GNSS-based localization continues to grow, these applications rely on the GNSS-based localization to be not only accurate in an open-sky environment, but also an urban environment. This is especially true when urban environments are densely populated with users of location-based services that deploy GNSS-based localization.

SUMMARY

One aspect of the disclosure provides a method of processing signal paths. The method includes receiving, at data processing hardware of a Global Navigation Satellite Systems-enabled (GNSS-enabled) device, an estimated location for a GNSS receiver in an environment. The method also includes generating, by the data processing hardware, a plurality of candidate positions about (e.g., around, surrounding, near, adjacent, etc.) the estimated location for the GNSS receiver where each candidate position of the plurality of candidate positions corresponds to a possible actual location of the GNSS receiver. The method further includes for each available satellite at each candidate position (of the plurality of candidate positions), modeling, by the data processing hardware, a plurality of candidate signal paths by ray-launching a raster map of geographical data for the environment. Here, the plurality of candidate signal paths includes one or more reflected signal paths. At each candidate position of the plurality of candidate positions, the method also includes comparing, by the data processing hardware, the plurality of candidate signal paths modeled for each available satellite at the respective candidate position to measured GNSS signal data from the GNSS receiver and generating, by the data processing hardware, a likelihood that the respective candidate position includes the actual location of the GNSS receiver based on the comparison of the plurality of candidate signal paths modeled for each available satellite at the respective candidate position to the measured GNSS signal data from the GNSS receiver.

Implementations of the disclosure may include one or more of the following optional features. In some implementations, the raster map includes a polygonal representation of each building in the environment, the polygonal representation constructed on the GNSS-enabled device. Modeling the plurality of candidate signal paths may include, for each candidate signal path of the plurality of candidate signal paths, determining an excess path length for the respective candidate signal path. Modeling the plurality of candidate signal paths may also include, for each candidate signal path of the plurality of candidate signal paths, determining a signal attenuation.

In some examples, the method further includes receiving, at the data processing hardware, rasterized geographical data including instructions for the GNSS-enabled device where the instructions indicate how to construct polygonal representations of one or more buildings in the environment. In these examples, the method also includes executing, by the data processing hardware, the instructions to form the raster map where the raster map includes a polygonal representation of one or more buildings in the environment. In these examples, the method further includes storing, by the data processing hardware, the raster map locally on memory hardware of the GNSS-enabled device in communication with the data processing hardware. Here, executing the instructions to form the raster map may include determining facade angles for the one or more buildings based on rasterized geographical data.

In some configurations, ray launching the raster map of geographical data for the urban environment further includes launching a ray from the respective candidate position to a polygonal raster representation of a respective structure in the urban environment. Here, ray launching the raster map of geographical data for the environment further also includes determining a redirected ray corresponding to a redirection of the ray off of the respective structure based on a facade angle of the polygonal raster representation of the respective building. In these configurations, ray launching the raster map of geographical data for the environment additionally includes continuing to launch the redirected ray at a redirected angle based on the facade angle of the respective structure.

Another aspect of the disclosure provides a Global Navigation Satellite System-enabled (GNSS-enabled) device for processing signal paths. The device includes data processing hardware and memory hardware in communication with the data processing hardware. The memory hardware stores instructions that when executed on the data processing hardware cause the data processing hardware to perform operations. The operations include receiving an estimated location for a GNSS receiver in an environment. The operations also include generating a plurality of candidate positions about (e.g., around, surrounding, near, adjacent, etc.) the estimated location for the GNSS receiver where each candidate position of the plurality of candidate positions corresponds to a possible actual location of the GNSS receiver. The operations further include for each available satellite at each candidate position (of the plurality of candidate positions), modeling a plurality of candidate signal paths by ray-launching a raster map of geographical data for the environment. Here, the plurality of candidate signal paths includes one or more reflected signal paths. At each candidate position of the plurality of candidate positions, the operations also include comparing the plurality of candidate signal paths modeled for each available satellite at the respective candidate position to measured GNSS signal data from the GNSS receiver and generating a likelihood that the respective candidate position includes the actual location of the GNSS receiver based on the comparison of the plurality of candidate signal paths modeled for each available satellite at the respective candidate position to the measured GNSS signal data from the GNSS receiver.

Implementations of the disclosure may include one or more of the following optional features. In some implementations, the raster map includes a polygonal representation of each building in the environment, the polygonal representation constructed on the GNSS-enabled device. Modeling the plurality of candidate signal paths may include, for each candidate signal path of the plurality of candidate signal paths, determining an excess path length for the respective candidate signal path. Modeling the plurality of candidate signal paths may also include, for each candidate signal path of the plurality of candidate signal paths, determining a signal attenuation.

In some examples, the operations further include receiving rasterized geographical data including instructions for the GNSS-enabled device where the instructions indicate how to construct polygonal representations of one or more buildings in the environment. In these examples, the operations also include executing the instructions to form the raster map where the raster map includes a polygonal representation of one or more buildings in the environment. In these examples, the operations further include storing the raster map locally on memory hardware of the GNSS-enabled device in communication with the data processing hardware. Here, executing the instructions to form the raster map may include determining facade angles for the one or more buildings based on rasterized geographical data.

In some configurations, ray launching the raster map of geographical data for the environment further includes launching a ray from the respective candidate position to a polygonal raster representation of a respective structure in the environment. Here, ray launching the raster map of geographical data for the environment further also includes determining a redirected ray corresponding to a redirection of the ray off of the respective structure based on a facade angle of the polygonal raster representation of the respective building. In these configurations, ray launching the raster map of geographical data for the environment additionally includes continuing to launch the redirected ray at a reflected angle based on the facade angle of the respective structure.

Yet another aspect of the disclosure provides a method of processing signal paths. The method includes identifying, by data processing hardware, an area having one or more structures likely to reflect a Global Navigation Satellite Systems (GNSS) signal from a satellite and partitioning, by the data processing hardware, the area into a plurality of locations. At each location of the plurality of locations for each available satellite, the method includes generating, by the data processing hardware, a plurality of signal paths by ray-launching front the respective location to the respective available satellite where the plurality of signal paths includes one or more line of sight signal paths and one or more reflected signal paths. At each location of the plurality of locations for each available satellite, the method also includes, discretizing, by the data processing hardware, all reflected signal paths into one or more azimuth ranges. At each location of the plurality of locations for each available satellite, the method further includes, for each azimuth range of the one or more azimuth ranges, determining, by the data processing hardware, one or more transition elevations where each transition elevation of the one or more transition elevations corresponds to a degree of elevation that a respective reflected signal path within the respective azimuth range transitions to a line of sight signal. At each location of the plurality of locations, the method also includes generating, by the data processing hardware, a signal path representation for the plurality of signal paths where the signal path representation includes the one or more azimuth ranges for all reflected signal paths and the one or more transition elevations associated with each azimuth range of the one or more azimuth ranges.

Implementations of the disclosure may include one or more of the following optional features. In some implementations, the method further includes determining, by the data processing hardware, an excess path length for each reflected signal path wherein the signal path representation further includes the excess path length for each reflected signal path. In some examples, the method farther includes determining, by the data processing hardware, an excess path length for each reflected signal path and for each azimuth range, discretizing, by the data processing hardware, the excess path lengths for all reflected signals within the respective azimuth range wherein the signal path representation further includes the discretized excess path lengths. Here, discretizing the excess path lengths for all reflected signals includes generating, using voronoi-based compression, a polygon region representing each discretized unit of excess path lengths.

In some examples, the method also includes for each azimuth range of the one or more azimuth ranges, discretizing, by the data processing hardware, the one or more transition elevations for all reflected signal paths within the respective azimuth range. In some configurations, the method also includes storing, by the data processing hardware, the signal path representation for the plurality of signal paths as a sparse data array and compressing, by the data processing hardware, the sparse data array.

In some implementations, the method also includes receiving, at the data processing hardware, a request including a requested position from a GNSS-enabled device. In these implementations, the method further includes identifying, by the data processing hardware, a respective location of the plurality of locations that corresponds to the requested position. Here, in response to the request, the method includes communicating, by the data processing hardware, the signal path representation for the respective location to the GNSS-enabled device.

Another aspect of the disclosure provides a system for processing signal paths. The system includes data processing hardware and memory hardware in communication with the data processing hardware. The memory hardware stores instructions that when executed on the data processing hardware cause the data processing hardware to perform operations. The operations include identifying an area having one or more structures likely to reflect a Global Navigation Satellite Systems (GNSS) signal from a satellite and partitioning the area into a plurality of locations. At each location of the plurality of locations for each available satellite, the operations include generating a plurality of signal paths by ray-launching from the respective location to the respective available satellite where the plurality of signal paths includes one or more line of sight signal paths and one or more reflected signal paths. At each location of the plurality of locations for each available satellite, the operations also include, discretizing all reflected signal paths into one or more azimuth ranges. At each location of the plurality of locations for each available satellite, the operations further include, for each azimuth range of the one or more azimuth ranges, determining one or mere transition elevations where each transition elevation of the one or more transition elevations corresponds to a degree of elevation that a respective reflected signal path within the respective azimuth range transitions to a line of sight signal. At each location of the plurality of locations, the operations also include generating a signal path representation for the plurality of signal paths where the signal path representation includes the one or more azimuth ranges for all reflected signal paths and the one or more transition elevations associated with each azimuth range of the one or more azimuth ranges.

Implementations of the disclosure may include one or more of the following optional features. In some implementations, the operations further include determining an excess path length for each reflected signal path wherein the signal path representation further includes the excess path length for each reflected signal path. In some examples, the operations further include determining an excess path length for each reflected signal path and for each azimuth range, discretizing the excess path lengths for all reflected signals within the respective azimuth range wherein the signal path representation further includes the discretized excess path lengths. Here, discretizing the excess path lengths for all reflected signals includes generating, using voronoi-based compression, a polygon region representing each discretized unit of excess path lengths.

In some examples, the operations also include for each azimuth range of the one or more azimuth ranges, discretizing the one or more transition elevations for all reflected signal paths within the respective azimuth range. In some configurations, the operations also include storing the signal path representation for the plurality of signal paths as a sparse data array and compressing the sparse data array.

In some implementations, the operations also include receiving a request including a requested position from a GNSS-enabled device. In these implementations, the operations further include identifying a respective location of the plurality of locations that corresponds to the requested position. Here, in response to the request, the operations include communicating the signal path representation for the respective location to the GNSS-enabled device Another aspect of the disclosure provides a method for generating a locational likelihood based on GNSS localization techniques. The method includes receiving, at data processing hardware of a GNSS-enabled device, an estimated location for a GNSS receiver in an environment. The method also includes generating, by the data processing hardware, a plurality of candidate positions about the estimated location for the GNSS receiver where each candidate position of the plurality of candidate positions corresponding to a possible actual location of the GNSS receiver. At each candidate position of the plurality of candidate positions about the estimated location for the GNSS receiver, the method includes determining, by the data processing hardware, using a first GNSS localization technique, a first probability that the respective candidate position is the actual location of the GNSS receiver. At each candidate position of the plurality of candidate positions about the estimated location for the GNSS receiver, the method also includes determining, by the data processing hardware, using a second GNSS localization technique that is different than the first GNSS localization technique, a second probability that the respective candidate position is the actual location of the GNSS receiver. At each candidate position of the plurality of candidate positions about the estimated location for the GNSS receiver, the method further includes generating, by the data processing hardware, an overall probability that the respective candidate position is the actual location of the GNSS receiver based on the first probability generated using the first GNSS localization technique and the second probability generated using the second GNSS localization technique The method may also include selecting, by the data processing hardware, from the plurality of candidate positions, the respective candidate position having a greatest overall probability as the actual location of the GNSS receiver.

Yet another aspect of the disclosure provides a system for processing signal paths. The system includes data processing hardware and memory hardware in communication with the data processing hardware. The memory hardware stores instructions that when executed on the data processing hardware cause the data processing hardware to perform operations. The operations include receiving, at a GNSS-enabled device, an estimated location for a GNSS receiver in an environment. The operations also include generating a plurality of candidate positions about the estimated location for the GNSS receiver where each candidate position of the plurality of candidate positions corresponding to a possible actual location of the GNSS receiver. At each candidate position of the plurality of candidate positions about the estimated location for the GNSS receiver, the operations include determining, using a first GNSS localization technique, a first probability that the respective candidate position is the actual location of the GNSS receiver. At each candidate position of the plurality of candidate positions about the estimated location for the GNSS receiver, the operations also include determining, using a second GNSS localization technique that is different than the first GNSS localization technique, a second probability that the respective candidate position is the actual location of the GNSS receiver. At each candidate position of the plurality of candidate positions about the estimated location for the GNSS receiver, the operations further include generating, by the data processing hardware, an overall probability that the respective candidate position is the actual location of the GNSS receiver based on the first probability generated using the first GNSS localization technique and the second probability generated using the second GNSS localization technique. The operations may also include selecting from the plurality of candidate positions, the respective candidate position having a greatest overall probability as the actual location of the GNSS receiver.

Implementations of the disclosure may include one or more of the following optional features for the method and/or the system of generating a locational likelihood based on GNSS localization techniques. In some examples, the first GNSS localization technique is configured to: receive measured GNSS signal data from the GNSS receiver; identify a signal strength for a respective GNSS signal for a particular satellite based on the measured GNSS signal data; determine one or more respective candidate positions of the plurality of candidate positions where the GNSS receiver would exhibit a respective signal strength for the particular satellite that corresponds to the identified signal strength; and generate a respective first probability for each of the one or more respective candidate positions. In these example, the first GNSS localization technique may be configured to determine the one or more respective candidate positions of the plurality of candidate positions where the GNSS receiver would exhibit the respective signal strength for the particular satellite that corresponds to the identified signal strength by: obtaining a structure map for the environment including the plurality of candidate positions; based on a known location of the particular satellite, identifying objects within the structure map that would obstruct a line of sight to the particular satellite; classifying each candidate position based on whether a respective object obstructs the line of sight from the respective candidate position to the particular satellite; and at each candidate position of the plurality of candidate positions, generating a predicted signal strength for the respective candidate position based on the classification of whether the respective object obstructs the line of sight from the respective candidate position to the particular satellite. In these examples, the first GNSS localization technique may be configured to determine the one or more respective candidate positions of the plurality of candidate positions where the GNSS receiver would exhibit the respective signal strength for the particular satellite that corresponds to the identified signal strength by, at each candidate position of the plurality of candidate positions, receiving, from a ray-launching tool, a probability of line of sight value and determining that a respective signal strength for the one or more respective candidate positions based on the probability of line of sight value corresponds to the signal strength for the respective GNSS signal for the particular satellite based on the measured GNSS signal data. The GNSS signal data may include a $C/N_0$ measurement.

In some implementations, the optional features include that the second GNSS localization technique is configured to receive measured GNSS signal data from the GNSS receiver, for each candidate position of the plurality of candidate positions, determine a difference between a measured pseudorange error and an expected pseudorange error based on the measured GNSS signal data; and, for each candidate position of the plurality of candidate positions, generate a respective second probability for the respective candidate position, the respective second probability representing how closely the measured pseudorange error matches the expected pseudorange error at a corresponding candidate position. In these implementations, the second GNSS localization technique is configured to determine the difference between the measured pseudorange error and the expected pseudorange error based on the measured GNSS signal data at the respective candidate position by generating the expected pseudorange using an excess path length corresponding to the respective candidate position. Here, the second GNSS localization technique may be configured to generate the expected pseudorange using the excess path length corresponding to the respective candidate position by combining the excess path length corresponding to the respective candidate position and a line of sight distance between the respective candidate location and a particular satellite transmitting a respective GNSS signal with the excess path length. The excess path length may correspond to the respective candidate position received from a ray-launching tool in communication with the data processing hardware.

Another aspect of the disclosure provides a method of modeling a full channel of signals. For each available satellite, the method includes receiving, at data processing hardware, a Global Navigation Satellite Systems (GNSS) signal measurement for each signal path received by a GNSS receiver within an environment. The method also includes establishing, by the data processing hardware, an estimated position for a location of the GNSS receiver within the environment. The method further includes generating, by the data processing hardware, a plurality of candidate positions about the estimated location for the GNSS receiver where each candidate position of the plurality of candidate positions corresponds to a possible actual location of the GNSS receiver. For each candidate positon of the plurality of candidate positions, the method further includes generating, by the data processing hardware, a correlation vector representing a pseudorange for the received GNSS signal measurements of each available satellite and generating, by the data processing hardware, an excess path length vector based on ray launching from the respective candidate position to a position of each respective available satellite. The method additionally includes identifying, by the data processing hardware, an actual position of the GNSS receiver corresponding to the respective candidate position among the plurality of candidate positions where the correlation vector most closely matches the excess path length vector.

In some examples, generating the correlation vector for each available satellite includes receiving respective GNSS signal measurements corresponding to a GNSS signal received by the GNSS receiver, detecting one or more peaks using a correlation process between the received GNSS signal and a local replica of the received GNSS signal; and generating a representation of each peak of the detected one or more peaks identified by the correlation process between the received GNSS signal and the local replica of the received GNSS signal. In these examples, generating the correlation vector for each available satellite may also include concatenating the representation generated for each satellite to form the correlation vector. In some implementations, the method also includes, for each candidate position, determining, by the data processing hardware, a standard deviation between the correlation vector and the excess path length vector. Here, the correlation vector most closely matches the excess path length vector when the respective candidate position includes the lowest standard deviation between the correlation vector and the excess path length vector.

An additional aspect of the disclosure provides a system for modeling a full channel of signals The system includes data processing hardware and memory hardware in communication with the data processing hardware. The memory hardware stores instructions that when executed on the data processing hardware cause the data processing hardware to perform operations. The operations include receiving a Global Navigation Satellite Systems (GNSS) signal measurement for each signal path received by a GNSS receiver within an environment. The operations also include establishing an estimated position for a location of the GNSS receiver within the environment. The operations further include generating a plurality of candidate positions about the estimated location for the GNSS receiver where each candidate position of the plurality of candidate positions corresponds to a possible actual location of the GNSS receiver. For each candidate positon of the plurality of candidate positions, the operations further include generating a correlation vector representing a pseudorange for the received GNSS signal measurements of each available satellite and generating an excess path length vector based on ray launching from the respective candidate position to a position of each respective available satellite. The operations additionally include identifying an actual position of the GNSS receiver corresponding to the respective candidate position among the plurality of candidate positions where the correlation vector most closely matches the excess path length vector.

In some configurations, the operation of generating the correlation vector for each available satellite includes receiving respective GNSS signal measurements corresponding to a GNSS signal received by the GNSS receiver; detecting one or more peaks using a correlation process between the received GNSS signal and a local replica of the received GNSS signal; and generating a representation of each peak of the detected one or more peaks identified by the correlation process between the received GNSS signal and the local replica of the received GNSS signal. In these configurations, the operations of generating the correlation vector for each available satellite may also include concatenating the representation generated for each satellite to form the correlation vector. In some implementations, the operations also include, for each candidate position, determining a standard deviation between the correlation vector and the excess path length vector. Here, the correlation vector most closely matches the excess path length vector when the respective candidate position includes the lowest standard deviation between the correlation vector and the excess path length vector.

Implementations of the disclosure may include one or more of the following optional features for the method and/or the system of modeling a full channel of signals. In some examples, generating the excess path length vector includes, launching a plurality of rays from the respective candidate position; for each ray of the plurality of rays launched from the respective candidate position, determining whether the respective ray of the plurality of rays terminates at a known satellite position and, when the respective ray of the plurality of rays terminates at the known satellite position, identifying the ray as a candidate signal path, and determining an excess path length for the respective ray identified as the candidate signal path for each ray of the plurality of rays launched from the respective candidate position. Each available satellite may include a single satellite. In some implementations, the correlation vector most closely matches the excess path length vector when, compared to all of the candidate positions, the respective candidate position includes an extrema of a loss function representing a difference between the correlation vector and the excess path length vector. Here, the loss function may be based on at least one of a signal strength of the GNSS signal measurements or a carrier-to-noise-density ratio of the GNSS signal measurements. In some configurations, the data processing hardware resides in a mobile device. A first portion of the data processing hardware may reside on a mobile device while a second remaining portion of the data processing hardware resides on a remote server in communication with the mobile device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
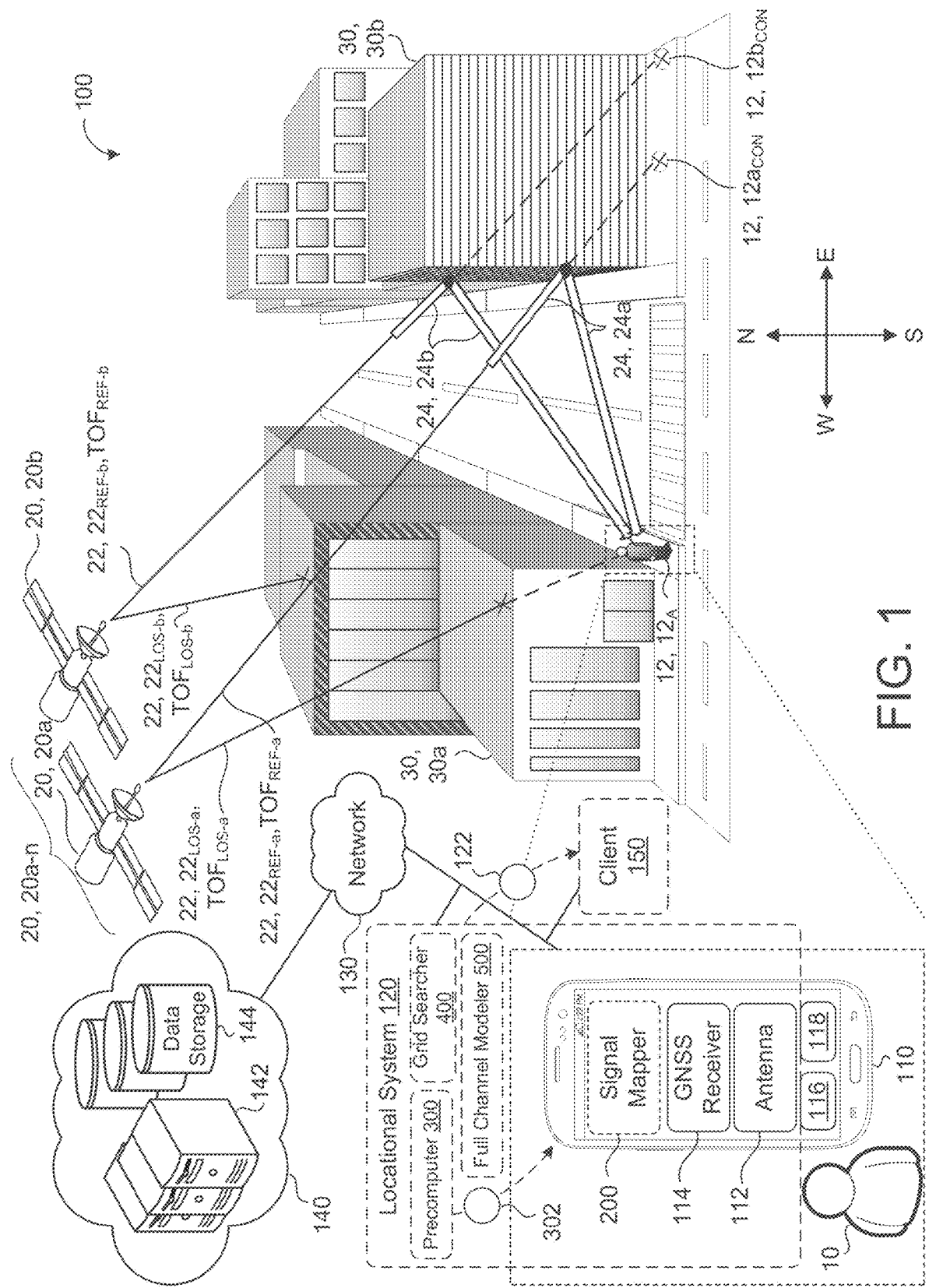
FIG. 1 is a perspective view of an example urban environment where a GNSS receiver is located.

As GNSS-based localization has become a ubiquitous part of location-based services, GNSS receivers have been incorporated into numerous computing devices. With the incorporation of a GNSS receiver, a computing device is considered a GNSS-enabled device that may perform some role to support GNSS localization whether that be receipt of a signal transmitted by a satellite (i.e., a GNSS signal) or the entire computation of a location for the GNSS receiver. Here, GNSS localization refers to the function of determining the location of a GNSS component such as the GNSS receiver. Therefore, when a computing device includes a GNSS receiver, GNSS localization determines the location of the GNSS receiver and also, by association, may determine the location of the GNSS-enabled device. This allows GNSS localization to be implemented in order to locate almost any object outfit as a GNSS-enabled device. As a result, GNSS localization has been deployed to locate agriculture equipment, transportation vehicles (e.g., cars, trucks, trains, planes, etc.), mobile devices (e.g., mobile phones, laptops, tablets, etc.), wearables (e.g., smart watches), internet of things (IOT) devices, and/or other GNSS-enabled devices.

A GNSS receiver is configured to receive GNSS signals from one or more visible orbiting satellites. Here, a visible satellite or available satellite refers to a particular orbiting satellite that transmits a GNSS signal of sufficient magnitude for the GNSS localization process (e.g., by the GNSS receiver or a localization system associated with the GNSS receiver) to utilize in position and navigational determinations. In contrast, there may be other orbiting satellites that are non-visible orbiting satellites. A non-visible orbiting satellite or non-available satellite refers to a satellite for which the received GNSS signal is of insufficient magnitude to be utilized in position and navigational determinations in a GNSS localization process. Stated differently, an available satellite is considered "in communication with the GNSS receiver" because the GNSS receiver receives a GNSS signal of sufficient magnitude from an available or visible satellite Although GNSS localization would prefer that satellites are visible (available) rather than not visible (not available), whether a satellite is visible to a GNSS-enabled device or not may be contingent on the environment or terrain about a GNSS-enabled device, in other words, when a GNSS-enabled device is in an open field, the open-field environment includes little if any terrain features that may inhibit a GNSS receiver from receiving a signal transmitted by an orbiting satellite. For instance, numerous satellites are visible in an open field. On the other hand, when a GNSS-enabled device is in a canyon surrounded by tall rock formations, there is likely to be only a small number of visible satellites, if any, and a greater number of non-visible satellites.

When a GNSS receiver is in a city or an urban environment, the GNSS receiver's ability to receive satellite signals is often more akin to a canyon than an open field in a city or urban environment, the signals from one or more satellites may be blocked or attenuated by the structures or buildings of the city. To compound the issue that a GNSS receiver may have fewer visible (or available) satellites in an urban environment, the signals from satellites that are visible (i.e., available) to the GNSS receiver are more likely being redirected (e.g., reflected, refracted, diffracted, or scattered one or more times) in the urban environment (e.g., off of structures or by structures) during their path to the GNSS receiver. These redirected (e.g., reflected) signals pose issues to systems that perform GNSS localization (referred to as locational systems) because GNSS localization uses time of flight for the path of the signal and assumes that received signals, whether redirected (e.g., reflected) or not, are line of sight signals. In other words, a line of sight signal has a path that extends from the satellite to the receiver without any redirection. Since, in reality, the signal is a redirected signal and seldom a line of sight signal, the redirection of the signal actually causes the signal to travel a greater distance than a distance traveled by a line of sight signal. Here, the difference between a line of sight signal and the greater distance of the actual or reflected signal is referred to as excess path length. The term excess path length identifies that the path of the reflected signal to the receiver has a longer (i.e., "excess") path length due to its reflection(s) than the path would have had as a direct line of sight signal.

Unfortunately, the location system, which is configured to identify where the receiver is located, inherently makes the assumption that signals received at the receiver are line of sight signals, even if they are, in reality, redirected signals. With this assumption, the location system often inaccurately identifies the location of the receiver in an urban space. An example manifesting this inaccuracy is that rideshare platforms using the GNSS system of GPS have a tendency to believe that a rideshare customer is on the other side of the street in an urban setting. Here, the rideshare customer's GPS receiver interprets its location on the wrong side of the street due to the excess path length of the reflected signal and relays this incorrect location to the rideshare driver via the rideshare platform. Since it is fairly common for locational systems in an urban environment to determine the location of the GNSS receiver on the wrong side of the street due to the excess path length, the GNSS industry sometimes refers to this problem as "the-wrong-side-of-the-street" problem.

A few different approaches have attempted to address the issues of locational accuracy for a GNSS receiver in an urban environment. For example, the locational system may integrate or use an inertial system to improve the locational accuracy. In other words, the GNSS receiver or a device associated with the GNSS receiver may employ motion sensors, such as accelerometers and/or rate gyros. The locational system may then use the measurements front these sensors to determine a position for the GNSS receiver. Yet here, there are significant drawbacks to using an inertial system to supplement the localization For instance, for the inertial system to be accurate at identifying a location of the GNSS receiver when reflected signals occur within an urban environment, the inertial system first needs an accurate determination of the GNSS receiver position. To initially begin with an accurate determination of the GNSS receiver position, the locational system would need a direct or line of sight signal that is not reflected to establish an initial GNSS receiver position for the inertial system. Without an accurate initial GNSS receiver position, the inertial system will lack an accurate reference state upon which to base its measurements. This approach therefore requires a relatively open area where GNSS signals may be received with no reflections prior to using the inertial system. The significant drawback with this approach is that, for pedestrians or even vehicles that start or reside entirely in the urban environment, a relatively open area is not available; causing the inertial system to be ineffective for supplemental localization when GNSS signals are being reflected in the urban environment. Additionally, an inertial system may increase cost, consume more processing resources, and/or occupy precious computing real estate for GNSS-enabled devices that have smaller envelopes. Furthermore, although mobile devices may have some existing inertial components (e.g., a mobile phone is able to determine its orientation), the inertial components in mobile devices, and particularly cellular phones, are rather rudimentary and incapable of performing localization to a high degree of accuracy.

Another approach to correcting locational inaccuracies for GNSS receivers in urban environments is referred to as shadow matching. Shadow matching is an approach that uses the signal strength received at a GNSS receiver to infer where the receiver is actually located. The premise is that if a signal from a satellite, for example, in the East has a weak signal strength detected at the GNSS receiver (e.g., due to signal redirection), it is presumed that the GNSS receiver is in a shadow of a building to the East. The premise is then applied in the aggregate to all satellites and their corresponding signals in order to converge on an estimated position for the GNSS receiver. Although this approach and variations to this approach have proven partially effective to correct locational inaccuracies for GNSS receivers in urban environments, the approach oversimplifies the cause of the issue. The signal strength received at a GNSS receiver may vary for reasons other than the signal being reflected off structures. For instance, the signal strength varies because the GNSS signal has to pass through a particular medium before reaching the receiver. In other words, the signal may be attenuated by foliage within the city or a body of a person carrying the GNSS receiver (e.g., the GNSS signal is a mobile device in a pocket of a person). Moreover, the type of GNSS receiver or type of GNSS-enabled device may also affect the signal strength for a GNSS signal. Without a way to account for these factors, shadow matching sometimes fails to be an effective approach for fixing the wrong-side-of-the-street problem on its own.

Another approach to overcome localization issues in an urban environment that does not rely on signal strength instead leverages the movement of the GNSS receiver. A GNSS signal from a satellite has a particular frequency. Yet when a moving GNSS receiver receives that signal, the particular frequency changes as a function of the GNSS receiver motion. In other words, a Doppler effect modifies the frequency of the GNSS signal based on the motion of the GNSS receiver. Doppler effect refers to a change in a frequency of a wave (e.g., sound or light) as the source of the wave (e.g., the satellite) and the destination of the wave (e.g., the receiver) move relative to one another. Here, this means that if the GNSS receiver is moving (e.g., a pedestrian walking or car driving), the motion of the GNSS receiver affects the frequency of the GNSS signal by some factor when compared to the GNSS signal being received by a stationary GNSS receiver. For instance, the velocity of a GNSS-enabled device having the GNSS receiver will change the apparent frequency of the received GNSS signal by the rate of wavelengths that the device moves through over some period of time. Since the frequency of the GNSS signal is known when the GNSS receiver is stationary, the change in frequency identifies the amount of Doppler effect that is impacting the frequency. By utilizing the Doppler effect at the GNSS receiver, this Doppler-based approach may accurately identify the position of the GNSS receiver. Since the Doppler-based approach does not rely on signal strength of the GNSS signal, the Doppler-based approach may enable the locational system to be effective even when the signal is being attenuated by other factors that commonly plague techniques like shadow-matching (e.g., the signal passing through additional mediums or the type of device associated with the GNSS receiver). Although this approach appears to cure some of the headaches with the wrong-side-of-the-street problem, this approach is not without its own setbacks. For instance, this Doppler-based approach is inherently dependent on a moving GNSS receiver to generate a Doppler effect. Yet the GNSS receiver and/or the GNSS-enabled device with the GNSS receiver is not always in a state of motion. For example, if the GNSS receiver was being carried on a pedestrian sitting on a bench waiting for a bus, the Doppler-based approach would be ineffective to locate the GNSS receiver.

The locational inaccuracy may also be addressed by attempting to correct the excess path length that results in the GNSS receiver being perceived in the wrong location. This would generally be the most straightforward approach because the GNSS receiver or a locational system in communication with the GNSS receiver currently approximates its own position. If the GNSS receiver or a locational system in communication with the receiver was able to compute the excess path length and use the excess path length to determine the location of the GNSS receiver (or GNSS-device having the GNSS receiver), it would alleviate the headaches of locational inaccuracy for a receiver in an urban environment. Yet such a correction approach may be difficult to implement because, in order to determine the excess path length of a reflected signal contributing to the locational error, the correction approach would be need the location of the GNSS receiver, presenting a chicken-and-egg problem since the excess path length inherently obfuscates that location.

One way of implementing a correction approach is to first approximate the location of the GNSS receiver and then, based on the approximate location and the signal strength of the GNSS signal at the GNSS receiver, the approach determines the excess portion of the path length for the reflected signal. This approach, though, needs some link to as to how GNSS signals may behave at the approximate location of the GNSS receiver in order to compare that behavior to the measured signal strength of the GNSS signal received at the GNSS receiver. Although it is possible to understand the behavior of signals at an approximate location using a signal modeling tactic (e.g., a ray-launching tactic), this signal modeling tactic is quite computationally expensive. For example, there may be several constellations of satellites where each satellite constellation includes multiple satellites. Each satellite within these constellations broadcasts its GNSS signals such that a satellite signal may be have numerous potential signal paths to the approximated location of the GNSS receiver. In an urban environment, this also means that the signal modeling tactic has to comprehend the reflectivity of GNSS signals for structures in the urban environment to model the numerous potential signal paths. Finally with this model of the numerous potential signal paths, the GNSS receiver or locational system may identify one of the potential signal paths as a path that appears to simulate the GNSS signal measurements received by the GNSS receiver (e.g., the signal strength of the GNSS signal). This modeling process is memory intensive due to the need for geographical data on three dimensional structures to understand the signal reflectivity. Furthermore, traditional signal modeling tactics function by storing such geographical data in memory. Signal modeling tactics may also be quite time consuming to determine all the possible paths for an approximate position. Although processing power of computing devices has been increasing as device size has been decreasing, signal modeling computations of this scale would tax a device's battery due to power consumption and still risk crashing the processor or overloading memory, especially when GNSS-based location services prefer to provide near real-time locations of the receiver. In other words, as a person carrying a GNSS-enabled device with a GNSS receiver moves about a city, signal modeling would constantly be running to enable the receiver or locational system to determine the new locations of the receiver. Based on all these factors, an excess path length approach has generally been untenable.

To overcome the intensive processing to model an excess path length for a GNSS signal, the modeling process may cater to the processing capabilities of a GNSS-enabled device. For instance, if the GNSS-enabled device wants to perform device-side modeling (i.e., modeling on the GNSS-enabled device), the locational system for the GNSS-enabled device may use a signal modeling tactic that reduces the storage footprint of the geographical data for the urban environment. In other words, the GNSS-related device performs signal modeling on a data structure that requires less memory consumption than a traditional signal modeling data structure. Alternatively, the GNSS-enabled device can avoid aspects of signal modeling by having a server-based system perform some of the signal modeling on a server in communication with the GNSS-enabled device. The server-based system may then provide signal path modeling results to the GNSS-enabled device upon request of the GNSS-enabled device. Thus, the GNSS-enabled device offloads some of the excess path length processing and in effect reduces its processing resources consumption for signal path modeling.

FIG. 1 is an example of an urban environment 100 where a GNSS-enabled device 110 (also referred to as a device 110) associated with a user 10 receives GNSS signals 22 transmitted from one or more satellites 20, 20*a-n*. For instance, FIG. 1 depicts two visible satellites 20, 20*a-b*. Here, each satellite 20 is shown transmitting a line of sight signal 22, $22_{LOS}$ blocked by buildings 30 in the urban environment 100 and a reflected signal 22, $22_{REF}$ reflecting off a building 30, 30*b* in the environment 100 before it. reaches the device 110 at the user 10. Although only two satellites 20 are depicted among the figures for simplicity, the GNSS-enabled device 110 may be configured to receive signals 22 at an antenna 112 associated with a GNSS receiver 114 transmitted from any GNSS satellite 20 within any of the GNSS constellations of satellites 20. In other words, the GNSS receiver 114 of the device 110 may receive signals 22 transmitted from satellites 20 associated with the Global Positioning System (GPS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS), and/or any similar systems, such as Low Earth Orbit or Geostationary satellites configured to transmit wireless signals. Moreover, although FIG. 1 depicts an urban environment 100, this is merely for illustration. The systems and methods herein may function in any environment such as a non-urban and/or semi-urban environment.

The device 110 includes an antenna 112 and a GNSS receiver 114 (also referred to as receiver 114). The antenna 112 is configured to function as an interface to receive a transmitted signal 22 (e.g., radio waves) from satellite 20 and to communicate the received signal 22 as an electrical input to the receiver 114. Generally speaking, based on the electrical input from the antenna 112, the receiver 114 is configured to interpret the signal-based information embodied in the received signal 22. The signal-based information may also be referred to as GNSS measurements (e.g., also referred to as measured GNSS signal data 202) or raw GNSS measurements. Satellites 20 typically broadcast a signal 22 as a radio wave at an operating frequency and wavelength in the L-band (i.e., a band of the radio spectrum internationally designated for GNSS technologies) at a time according to their atomic clocks. The broadcasted signal 22 from a satellite 20 has a frequency in the L-band, satellite information (e.g., coded satellite information), and carries a navigation message. The navigation message includes timing information, such as a time at the satellite that the satellite transmitted the signal 22 and a time of arrival of the signal 22 at the receiver 114/antenna 112, and positional information, such as a location of the satellite 20 at the time of transmission. By having the time-of-flight TOF (e.g., shown as the time-of-flight $TOF_{LOS}$ for a line of sight signal $22_{LOS}$ and the time-of-flight $TOF_{REF}$ for a reflected signal $22_{REF}$) by the combination of the time of transmission and the time of arrival, the receiver 114 can measure a pseudorange corresponding to the range between the receiver 114 and the satellite 20 that sent the signal 22. To determine the satellite-to-receiver distance, the receiver 114 scales the pseudorange by the speed of light. This timing information also provides the receiver 114 with an understanding of a clock timing at the satellite (e.g., from the time of transmission) with respect to a clock timing at the receiver 114 (e.g., from the time of arrival). When the receiver 114 receives a signal 22, the receiver 114 is also configured to measure the strength of the signal 22 (e.g., in decibels (dBm or dBHz)). In addition to the timing information and positional information, the signal 22 includes satellite information. This satellite information may identify a unique identifier indicating the particular satellite 20 transmitting the signal 22 and the constellation for that particular satellite 20 (e.g., GPS, GLONASS. GALILEO, QZSS, BeiDou or IRNSS). From the signal-based information, a locational system 120 in communication with the receiver 114 determines a location 12 of the recipient of the signal 22. In the examples shown, the location 12 of the recipient of the signal 22 is the location 12 of the receiver 114, the device 110, and the user 10 since the receiver 114 is a component of the device 110 and the device 110 (e.g., shown as a mobile phone) is being carried by the user 10. Due to the synonymous locations of the device 110, the receiver 114, and the user 10 in these examples, the locations of these terms may be referred to interchangeably although it is conceivable that these locations may differ in other examples. For instance, the device 110 is a driver-less, self-driving vehicle with a GNSS receiver 114.

The device 110 may be any computing device capable of supporting the receiver 114. For instance, the device 110 is configured to support logic, circuitry, and/or code that is configured to determine its own location in response to a signal 22 from a satellite 20. Some examples of devices 110 include mobile devices (e.g., a mobile phone, laptop, tablet, mobile navigation device, etc.), vehicle electronics (e.g., vehicle control modules, avionics, boat electronics, etc.), wearables (e.g., smart watches or smart glasses), gaming devices, audio/video capturing devices (e.g., cameras or video cameras), and/or IoT devices (e.g., smart consumer electronics, smart appliances, smart speakers, smart home devices, smart meters, etc.). The device 110 includes data processing hardware 116 and memory hardware 118 in communication with the data processing hardware 116 and storing instructions, that when executed by the data processing hardware 116, cause the data processing hardware 116 to perform one or more operations (e.g., related to GNSS localization). In some examples, the device 110 includes one or more applications (i.e., software applications) where each application may utilize the locational system 120 associated with device 110 to perform various functions within the application. For instance, the device 110 includes a navigation application configured to display the location 12 of the device 110 for the user 10.

Furthermore, the device 110 may be configured to communicate via a network 130 with a remote system 140. The remote system 140 may include remote resources, such as remote data processing hardware 142 (e.g., remote servers or CPUs) and/or remote memory hardware 144 (e.g., remote databases or other storage hardware). The device 110 may utilize the remote resources to perform various functionality related to GNSS localization. For instance, the device 110 is configured to perform GNSS localization using the locational system 120. Here, FIG. 1 depicts the locational system 120 as a dotted box around the antenna 112, the receiver 114, a signal mapper 200, a precomputer 300, a grid searcher 400, and a full channel modeler 500 to illustrate that the locational system 120 generally refers to a system that enables the receiver 114 and/or GNSS-enabled device 110 to perform GNSS localization. The components of the locational system 120 may therefore reside on the device 110 (referred to as on-device systems) or reside remotely (e.g., reside on the remote system 140), but in communication with the device 110. For example, FIG. 1 illustrates the signal mapper 200 located on the device 110 to indicate that some or all of the functionality of signal mapper 200 may occur on the device 110 itself. Whereas, FIG. 1 also depicts the precomputer 300 remote front device 110 to illustrate that generally the precomputer 300 performs its functionality remotely (i.e., server-side) or not on the device 110 (i.e., off-device). Since each of the signal mapper 200 and the precomputer 300 are capable of performing some aspect of GNSS localization, FIG. 1 depicts them as part of the locational system 120. Although generally speaking, the signal mapper 200 and the precomputer 300 perform their functions, on-device and off-device respectively, some of their functionality may he configured to reside remotely or locally without compromising the processing needs of GNSS localization for the device 110. When functions of the locational system 120 reside remotely, the locational system uses the remote resources such as the remote data processing hardware 142 and the remote memory hardware 144. In contrast, when an aspect of the locational system 120 resides locally the locational system utilizes the local resources of the device 110, such as the data processing hardware 116 and the memory hardware 118. Here, one such advantage of the precomputer 300 residing remotely is that the device 110 may perform GNSS localization functions with the remote resources rather than taxing or consuming the local resources. Although FIG. 1 does not depict the full channel modeler 500 residing on the device 110, some or all of the functionality of the full channel modeler 500 may be configured to reside on the device 110. In other words, the full channel modeler 500 may be reside entirely remotely (e.g., on the remote system 140), entirely locally (e.g., on the device 110), or some hybrid combination of both.

Referring further to FIG. 1, each reflected signal $22_{REF-a,b}$ from the first and second satellites 20a-b includes an excess path length 24 (e.g., shown as a first excess path length 24, 24a and a second excess path length 24, 24b). As previously stated, the excess path length 24 is the difference between a length of the reflected signal $22_{REF}$ and a length of a line of sight signal $22_{LOS}$ from the same satellite 20. For instance, FIG. 1 depicts the length of the line of sight signal $22_{LOS}$ for the first satellite 20a as a combination of the dotted line that terminates at the user 10 and the solid line terminating at the first building 30, 30a. Based on this line of sight signal length, the excess path length 24a for the reflected signal $22_{REF}$ from the first satellite 20a is shown as the block portion along the reflected signal 22, $22_{REF-a}$. The excess path length 24, 24b for the second satellite 20b is shown in a similar manner.

In a system that performs conventional GNSS localization, the conventional system would identify the time-of-flight $TOF_{REF}$ for the signals 22 actually received at the receiver 114 (e.g., the reflected signals $22_{REF}$ that are not blocked by buildings 30) and interpret the location 12 of the device 110 at the conventional positions 12, $12a\text{-}b_{CON}$ shown in FIG. 1. In other words, the conventional system assumes the signal 22 is a line of sight signal $22_{LOS}$ rather than a reflected signal $22_{REF}$ and simply calculates the conventional position $12_{CON}$ as a straight line extension of the excess path length 24. For multiple signals 22 received at a receiver 114, GNSS localization would combine the determined location 12 for each satellite 20 to form an aggregate position. Here, the conventional system would combine the first conventional position 12, $12a_{CON}$ and the second conventional position 12, $12b_{CON}$ to form an aggregate position. As can be seen from FIG. 1, a GNSS localization process performed in a conventional manner would interpret the receiver 114 as being located on the wrong side of the street compared to the actual position 12, $12_A$ of the receiver 114.

To overcome the inaccuracies of a conventional GNSS localization system, the locational system 120 enables signal path modeling to generate signal paths in a computationally efficient manner either on-device via the signal mapper 200 or remotely via the precomputer 300. Whether signal path modeling is performed remotely or locally may depend on, for example, which GNSS-based services are being used by the user 10 or the type of device 110. For instance, a device 110 that has more processing and memory capabilities implements the signal mapper 200 to perform signal path modeling while a device 110 with limiting processing and memory capabilities (e.g., dedicated to other tasks or limited in size) implements the precomputer 300. In some examples, the GNSS-based location service is an application downloaded locally that uses the signal mapper 200 or is an application programming interface (API) that communicates with a remote system 140 using the precomputer 300.

Figure 2A:
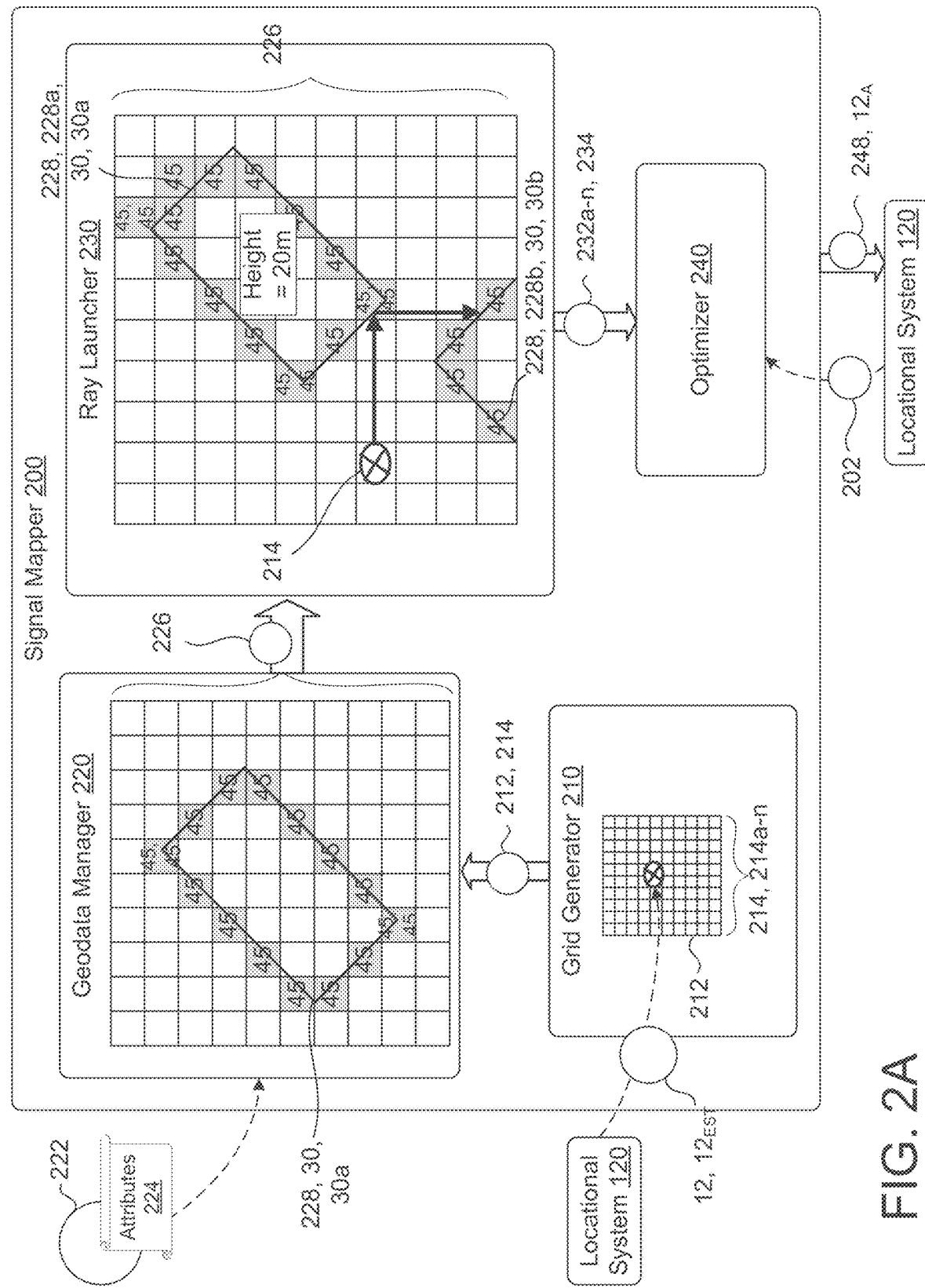
FIGS. 2A-2C are schematic views of example signal mappers for signal path modeling on a GNSS-enabled device.
Figure 2B:
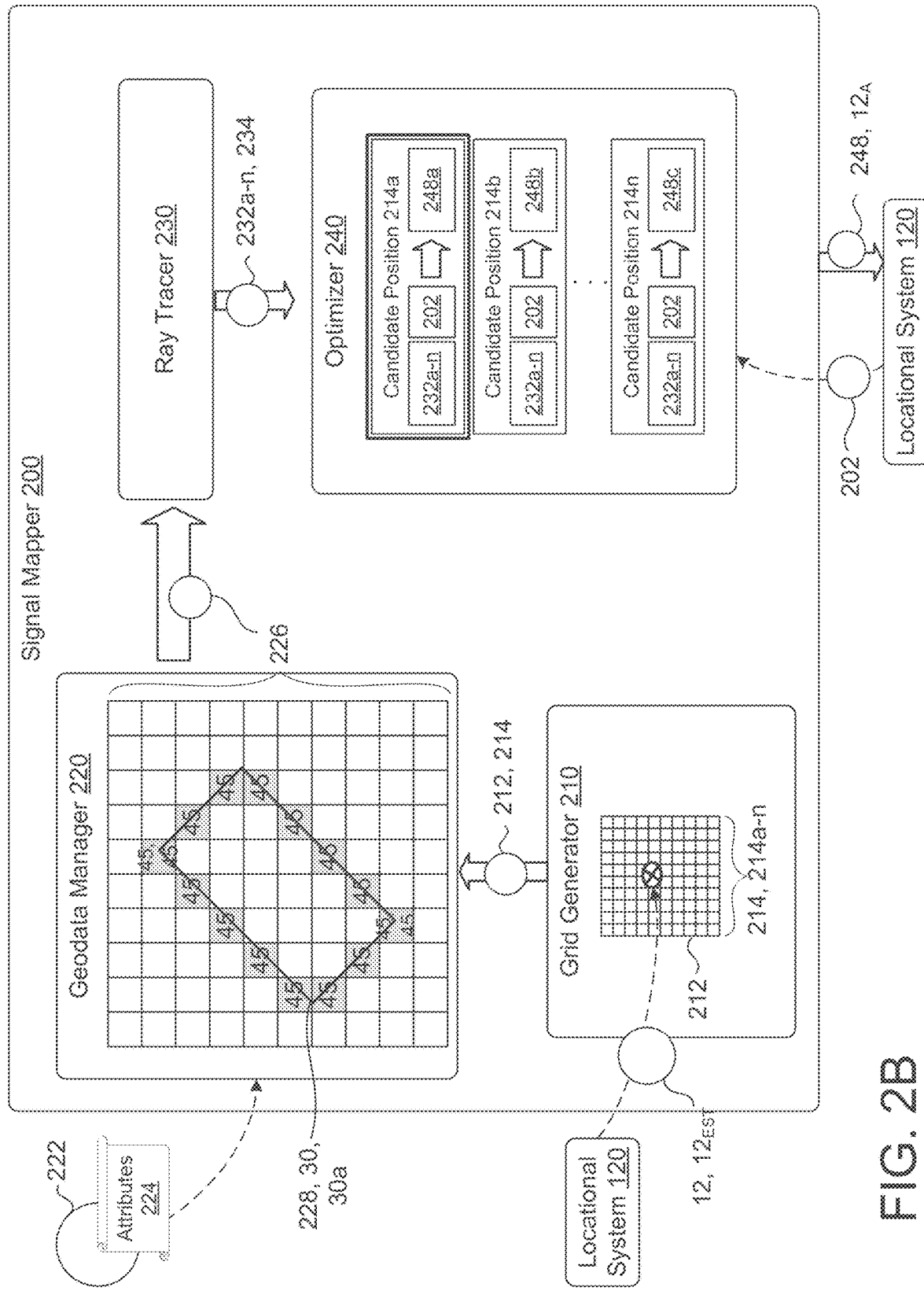
Figure 2C:
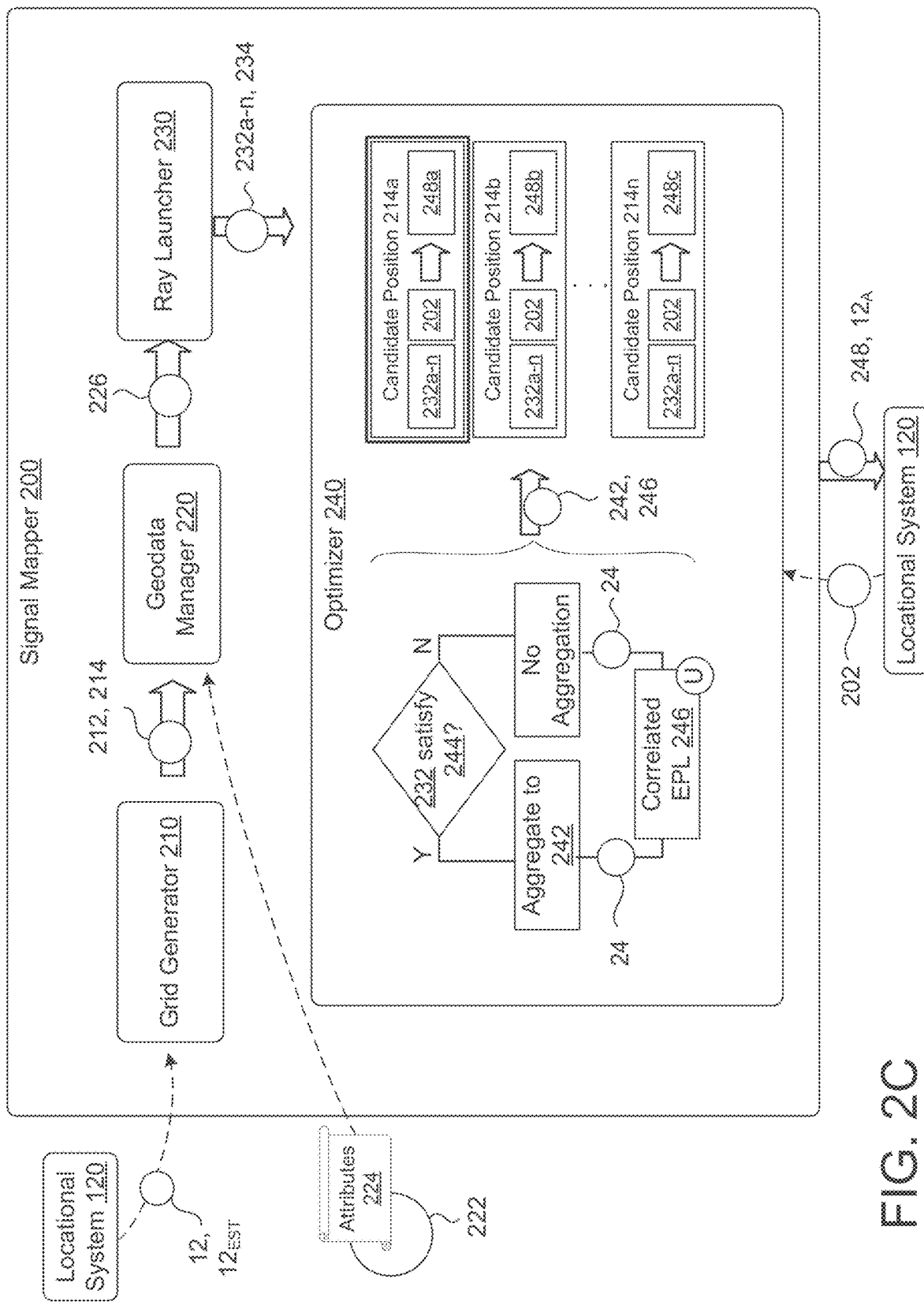

Referring to FIGS. 2A-2C, the signal mapper 200 generally includes a grid generator 210, a geodata manager 220, a ray tracer 230, and an optimizer 240 The grid generator 210 is configured to receive an estimated location $12_{EST}$ (also referred to as an estimated position) from the locational system 120. Generally, the estimated location $12_{EST}$ refers to any representation of position, such as any projected or Cartesian coordinates. The estimated location $12_{EST}$ may correspond to a location 12 where the receiver 114, based on conventional GNSS localization system, believes the receiver 114 to be located (e.g., the conventional location $12_{CON}$ based on a line of sight assumption for the signal 22). In other examples, the grid generator 210 generates the estimated location $12_{EST}$ itself (e.g. based on conventional GNSS localization). In either approach, with the estimated location $12_{EST}$, the grid generator 210 generates a plurality of positions about the estimated location $12_{EST}$ (i.e., adjacent to or radiating outward from the estimated location $12_{EST}$) where each position of the plurality of positions corresponds to a candidate position 214 that may represent the actual location $12_A$ of the receiver 114. Therefore, although the conventional location $12_{CON}$ for the receiver 114 is inaccurate, this conventional location $12_{CON}$ is unlikely to be so grossly inaccurate that the plurality of candidate positions 214 would not include the actual position $12_A$. Moreover, if this appears to be the case, the grid generator 210 may be configured to adjust the resolution regarding the size of each candidate position 214 and/or the number of candidate positions 214 that are generated about the estimated location $12_{EST}$.

In some examples, in order to ensure that each position about the estimated location $12_{EST}$ systematically analyzed, the grid generator 210 generates the plurality of the candidate positions 214 as a grid 212 where each point in the grid 212 represents a candidate position 214. For instance, FIG. 2A illustrates a grid 212 where the center of the grid 212 is the estimated location $12_{EST}$ with candidate positions 214 generated in each direction about the estimated location $12_{EST}$ (e.g., northerly, southerly, easterly, and westerly). The grid 212, or, more generally the plurality of candidate positions 214, represents potential locations where the receiver 114 may be located on the plane parallel to Earth's surface. In some implementations, when the grid generator 210 generates the plurality of candidate positions 214, the grid generator 210 may also take into account buildings 30 or other structures. For instance, the grid generator 210 may ignore generating a candidate position 214 where it knows there is a building 30 or other structure.

The geodata manager 220 is configured to manage geographical data (geodata) 222 for an area such as the urban environment 100. In some examples, the geodata manager 220 receives the geographical data 222 from a geodata collection system(s) and/or geodata repositories. The geodata manager 220 may receive the geodata 222 in the form of raster tiles (e.g., compressed raster tiles). Here, the raster tiles may be sparse arrays of low-precision floats that a geodata collection system, or a geodata serving system, compresses and communicates to the geodata manager 220. In some implementations, when the geodata manager 220 receives the geodata 222, the geodata 222 includes attributes 224 describing features of terrain and/or structures at a particular location. These attributes 224 describing the particular location may include: an altitude referring to an altitude of a ground plane with respect to mean sea level (e.g., geoid mean sea level); a height referring to a height of an object at the particular location; a class indicating a type of object at the particular location; and one or more facade angles referring to angles of the facade of an object at the particular location (e.g., the facade of a building 30). In some examples, the particular location may be classified by a class of either open space, a building, or a tree.

In some implementations, the attributes 224 serve as instructions for the geodata manager 220 to form a raster map 226 that includes polygonal representations 228 of structures within an environment (e.g., the urban environment 100). For example, these polygonal representations 228 may correspond to polygonal models of building(s) 30, trees (foliage), or other representable structures that may impact a path 24 of a signal 22. In some configurations, the geodata manager 220 receives one or more candidate positions 214 (e.g., the grid 212 about the estimated location $12_{EST}$) and generates the raster map 226 using the geodata 222 and attributes 224. When generating the raster map 226, the geodata manager 220 may use the attributes 224 to construct polygonal representations 228 for particular locations (e.g., candidate locations 214) classified as buildings or trees. Here, when the attribute 224 identifies a building the geodata manager 220 identifies one or more facade angles (e.g., shown as forty-five degrees in FIG. 2A) for the building 30 at the location to construct the polygonal representation 228 of the building 30. For instance, a sequence of adjacent locations having the same facade angle generates a straight line face for the polygonal representation 228 that corresponds to a face or a side of a building 30. In this process, the geodata manager 220 is also able to infer a corner of the building 30 at a location because the corresponding location will include multiple facade angles (e.g., two facade angles for intersecting faces of the polygonal representation 228). When the geodata manager 220 generates the raster map 226, the raster map 226 may be stored on the device 110 executing the signal mapper 200.

The geodata manager 220 may be configured to manage geodata 222 stored in a variety of coordinate systems. For example, the geodata manager 220 manages geodata 222 stored in spherical coordinates (e.g., Plate Carree with latitude and longitude). In these configurations, the geodata manager 220 is configured to project the spherical coordinates to generate the raster map 226. For instance, the geodata manager 220 uses an equirectangular projection (or some variation thereof) in order to generate the raster map 226. In some examples, the geodata manager 220 manages geodata 222 stored in a Universal Transverse Mercator (UTM) coordinate system.

Ray launching generally refers to a method of simulating a ray or path for a signal 22. Here, given a hypothetical position (e.g., a candidate position 214), the ray launcher 230 simulates the path for the signal 22 from a satellite 20 by propagating rays from multiple directions from the hypothetical position (e.g., the candidate position 214). By tracing or launching each of the propagated rays in each direction, the ray launcher 230 models whether a particular ray terminates at the known location for the satellite 20. In other words, since satellites 20 broadcast their position in their signal transmissions, the ray launcher 230 attempts to work backwards and trace a ray from a hypothetical position (e.g., a candidate position 214) of a recipient of a signal 22 to a broadcasted location of a satellite 20. In some examples, the ray launcher 230 receives a list of one or more satellites 20 to include when ray launching. Here, the list may identify the satellite information, such as an elevation and an azimuth for each satellite 20. When a ray terminates at a known satellite location (e.g., elevation and azimuth), the ray launcher 230 identifies the ray as a candidate signal path 232 for the signal 22.

To accurately ray-launch for the urban environment 100, the ray launcher 230 has access to or obtains a structure model or building model for the urban environment 100. In some examples, in order to minimize the size of the building model used during ray launching, the ray launcher 230 of the signal mapper 200 receives the raster map 226 from the geodata manager 220. With the raster map 226, the ray launcher 230 launches a ray from the candidate position 214 in a particular direction to identify whether the ray encounters a polygonal representation 228 for a building 30 in the raster map 226. When the ray encounters or intersects with the polygonal representation 228, the ray launcher 230 is configured to identify the facade angle at the intersection point with the polygonal representation 228 and to determine at which angle to continue launching the ray as a redirection (e.g., a reflection, refraction, diffraction, and/or scattering) off of the polygonal representation 228 in order to simulate a redirection (e.g., a reflection) off of the building 30. For example, FIG. 2A depicts an arrow representing a ray originating at a candidate location 214 and reflecting off a first polygonal representation 228, 228a for a first building 30, 30a and into a second polygonal representation 228, 228b for a second building 30, 30b. The ray launcher 230 continues tracing each ray to determine whether the ray terminates at a known satellite position (e.g., an elevation and azimuth corresponding to a satellite 20). Using this ray launching technique in combination with the raster map 226, the ray launcher 230 is also capable of accounting for and tracing scattered rays at each reflection point during ray launching The ray launcher 230 may also be capable of modeling signal penetration in different structures such as in foliage (e.g., trees) and/or in buildings.

In some implementations, for a given candidate position 214, the ray launcher 230 traces rays for each azimuth from the candidate position 214 and at each elevation of each azimuth. The ray launcher 230 may propagate rays radially outward from the candidate position 214 from zero to about ninety degrees elevation at each azimuth angle from zero to three hundred and sixty degrees. In some examples, prior to ray launching, the ray launcher 230 extracts a vertical profile from the raster map 226 to understand how a ray from a candidate location 214 will behave at particular elevations for a particular azimuth. For instance, referring further to FIG. 2A, the raster map 226 is basically a 2.5 dimensional representation of the urban environment 100. In other words, the raster map 226 functions like a two-dimensional pixel map where each pixel corresponds to a candidate position 214 (e.g., x-y location or longitude and latitude). Here, the additional half-dimension stems from the fact that each pixel includes attribute information such as the height of an object at that pixel. From this height information, the ray launcher 230 may derive a vertical plane at a particular pixel (e.g., candidate position 214) and from the vertical plane may understand which portions of the vertical plane are occupied by an object such as a building 30. For instance, in FIG. 2A, the attributes 224 of the raster map 226 identify that a first building 30, 30a has a height of twenty meters. Based on this information, the ray launcher 230 understands that a vertical plane at a pixel occupied by that building 30 would be occupied from zero to twenty meters, but unoccupied or open above twenty meters. In some examples, the ray launcher 230 extracts the height information from each position (i.e., pixel) in the raster map 226 and constructs a data array for each position to generate the vertical height representation. The vertical height representations for all pixels may be combined together to form a matrix. With the vertical height representation, the ray launcher 230, when ray launching, is able to identify, for example, that a ray at thirty meters is not reflected by the building 30, 30a. Furthermore, the ray launcher 230 may launch a ray on a horizontal plane, but still understand the behavior of the ray in a vertical plane by referencing vertical height representations for pixels that the ray passes through. By combining this with a general rule of thumb that a ray is more likely to terminate at a satellite 20 at a certain elevation if all the vertical angles of the ray's reflections are equal to the satellite's elevation, the ray launcher 230 is able to accurately model ray behavior from a raster map 226 of minimal data storage size.

Since ray tracing is a recursive process for azimuths and elevations, its recursive nature lends itself to significant calculation time and memory usage. To attempt to minimize some memory and processing consumption, when the ray launcher 230 ray launches, the ray launcher 230 may be configured to determine whether an object generated during a single ray trace is no longer needed for subsequent ray launching. When the ray launching 230 identifies that an object is no longer needed, the ray launcher 230 is configured to delete the object to alleviate any resource consumption related to that object. In some examples, the ray launcher 230 includes a threshold number of reflections to limit the number of reflections that need to be computed for each ray; reducing calculation and processing time. For instance, when the threshold number of reflections is set to a value of two, the ray launcher 230 terminates ray launching for a ray when the ray launching 230 identifies a third reflection for the ray. Additionally or alternatively, the ray launcher 230 may avoid some processing resource consumption by limiting scattered rays to certain scattering bounds or even ignoring scattered rays from a reflection and instead only launching perfect reflections.

As a result of ray launching, the ray launcher 230 is configured to determine one or more candidate signal paths 232 that may correspond to a signal path received by the receiver 114. For each candidate signal path 232, the ray launcher 230 may also generate path characteristics 234. Some examples of path characteristics 234 includes path type (e.g., line of sight or reflected), attenuation along the candidate signal path 232, excess path length 24, a sum of the scattering angles along the candidate signal path 232, and other scattering information. The signal mapper 200 therefore uses the functionality of the ray launcher 230 to identify one or more candidate signal paths 232 that may correspond to an actual signal 22 received by the receiver 114. In some examples, the path characteristics 234 indicate whether a candidate signal path 232 is likely to correspond to the actual signal 22.

Referring to FIGS. 2B and 2C, the optimizer 240 is configured to receive the candidate signal paths 232 and to identify a candidate position 214 based on at least one of the candidate signal paths 232 that likely corresponds to the actual location $12_A$ of the receiver 114. In some examples, before using the candidate signal paths 232 to identify the actual location $12_A$ of the receiver 114, the optimizer 240 is configured to preprocess the candidate signal paths 232 received by the ray launcher 230. For instance, as shown in FIG. 2C, the optimizer 240 aggregates all similar candidate signal paths 232 into a single aggregate candidate signal path 242. In some configurations, to perform aggregation of similar candidate signal paths 232, the optimizer 240 determines whether two or more candidate signal paths 232 satisfy aggregation criteria 244. To satisfy the aggregation criterial 244, the relationship between two candidate signal paths 232 must meet at least one of two aggregation conditions. The first condition is based on a distance between reflection points of two candidate signal paths 232. For instance, the cumulative distance between reflection points of two candidate signal paths 232 is less than a determined value such as a tunable determined value (e.g., about fifty meters). The second condition is based on a difference between excess path lengths 24 of two candidate signal paths 232. For example, the difference between the excess path lengths is less than a determined value such as a tunable determined value (e.g., about fifty meters).

The optimizer 240 may also correlate excess path lengths 24 from the plurality of candidate signal paths 232 as part of preprocessing to generate a correlated excess path length 246. Here, the optimizer 240 is trying to simulate what a chip is doing with multiple different radio paths. To correlate excess path lengths 24, the optimizer 240 receives the aggregated candidate signal paths 242, the excess path lengths 24 for the aggregated candidate signal paths 242, an attenuation for the aggregated candidate signal paths 242, and a chip length corresponding to a virtual size (e.g., in meters) of a chip in the GNSS signal. In some examples, the optimizer 240 also generates a representation of an uncertainty U for the correlated excess path length 246.

By preprocessing the candidate signal paths 232 (e.g., aggregating and correlation), the optimizer 240 reduces the number of candidate signal paths 232 per candidate position 214 that it would need to compare for similarity to measured GNSS signal data received at the receiver 114 for the actual signal 22. For example, although it is possible for the optimizer 240 to compare each candidate signal path 232 of each position to measured GNSS signal data 202 received at the receiver 114 for the actual signal 22, each of the aggregating process and the correlating process reduces the number of candidate signal paths 232 that need to be compared at each candidate location 214. Whether preprocessing techniques are applied or not, the optimizer 240, at each candidate position 214, compares each of the candidate signal paths 232 (or aggregate candidate signal paths 242) to measured GNSS signal data 202 from the actual signal 22 received at the receiver 114. Based on this comparison, the optimizer 240 may generate a likelihood 248 (e.g., a probability) for each candidate position 214 (e.g., shown in FIG. 2C as likelihoods 248a-n) identifying how closely the candidate signal paths 232 corresponding to a candidate position 214 match the measured GNSS signal data 202 front the actual signal 22. For instance, from the time-of-flight TOF for the signal 22 received at the receiver 114, the receiver 114 is able to generate a pseudorange and a distance from the receiver 114 to the satellite 20 that actually corresponds to a total length of a reflected signal $22_{REF}$ and not a length of a line of sight signal $22_{LOS}$. Therefore, when a candidate signal path 232 at a particular candidate position 214 has an excess path length 24 that would result in a similar time of flight TOF as the actual signal 22, that candidate signal path 232 is likely to be the actual signal 22; meaning the particular candidate position 214 is likely the actual location $12_A$ of the receiver 114. Based on this principle, the optimizer 240 is able to compare candidate signal paths 232 at candidate positions 214 to determine a likelihood 248 that the candidate position 214 is the actual location $12_A$ for the receiver 114. In some examples, as illustrated in FIGS. 2B and 2C by the darkened box around a first candidate position 214a, the optimizer 240 is also configured to select the candidate position 214 that has the greatest likelihood 248 as the candidate position 214 that represents the actual location $12_A$ for the receiver 114.

Figure 3A:
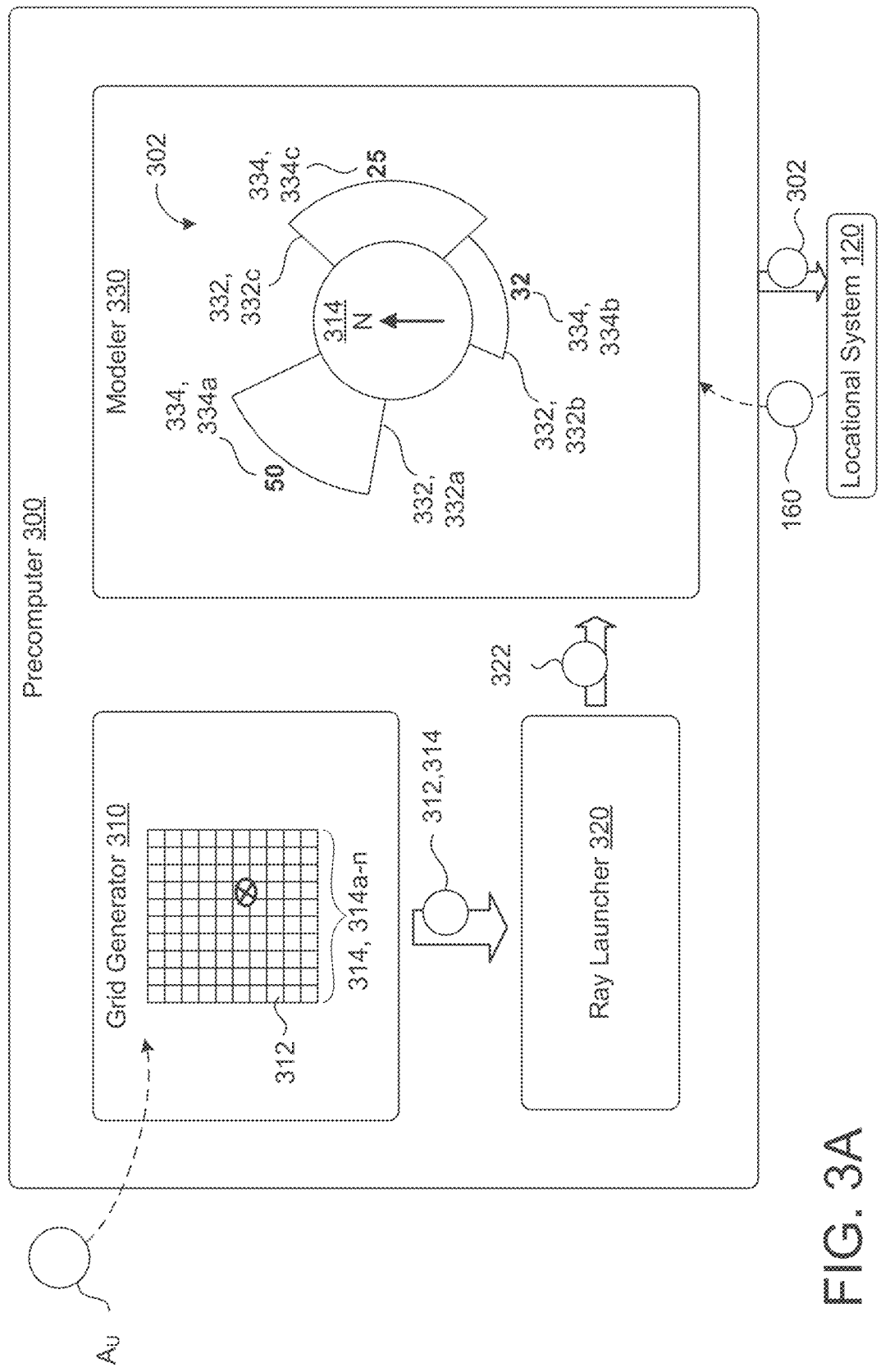
FIGS. 3A and 3B are schematic views of example pre-computers for signal path modeling on a remote system in communication with a GNSS-enabled device.
Figure 3B:
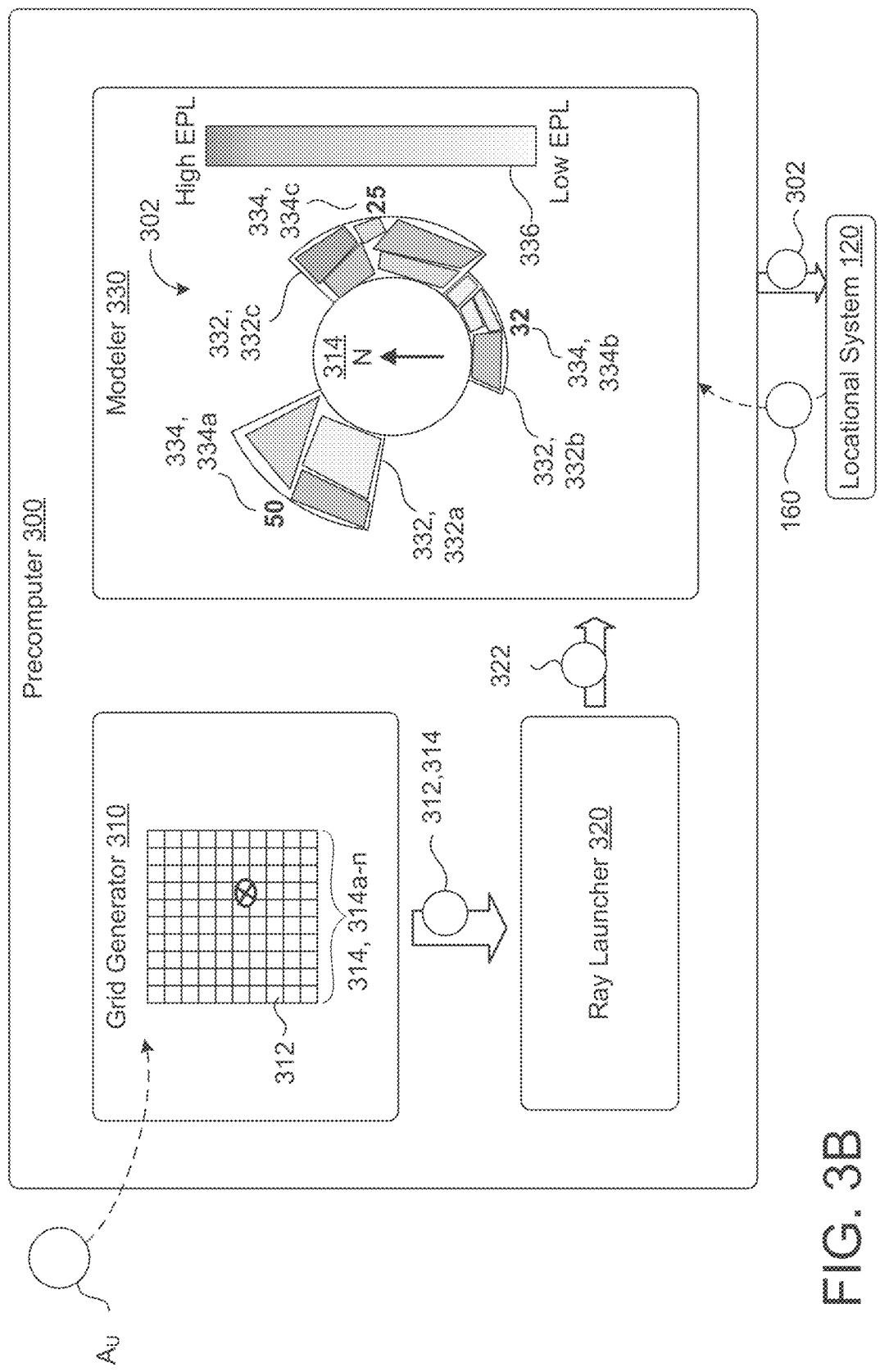

FIGS. 3A and 3B are examples of the precomputer 300. The precomputer 300 is configured to perform signal path modeling ahead of time and to communicate a signal path representation 302 resulting from the signal path modeling to the GNSS-enabled device 110. The precomputer 300 generally includes a grid generator 310, a ray launcher 320, and a modeler 330. Here, the grid generator 310 functions similarly to the grid generator 210 of the on-device signal mapper 200. But unlike the grid generator 210 of the signal mapper 200, the grid generator 310 does not receive an estimated location $12_{EST}$ of the receiver 114 because the grid generator 310 determines the signal path representation 302 before and therefore independent of the receiver 114 receiving a signal 22. Instead of an estimated location $12_{EST}$, the grid generator 310 is configured to receive an area $A_U$ (e.g., an urban area such as the urban environment 100) and to partition the area $A_U$ into a plurality of locations 314 akin to the plurality of candidate positions 214. Here, the grid generator 310 may receive the area $A_U$ from any source or be configured to identify the area $A_U$ itself. Much like the grid generator 210, the grid generator 310 may generate the plurality of locations 314 as a grid 312 where each point in the grid 312 represents a location 314.

Also similar to the signal mapper 200, the precomputer 300 includes the ray launcher 320. Yet in contrast to the ray launcher 230 of the signal mapper 200, the ray launcher 320 of the precomputer 300 is operating remotely (e.g., in the remote system 140) and is not restricted to processing resources of the device 110. For this reason, the precomputer 300 does not need to ray launch a data-size conscientious raster map 226. Rather, the ray launcher 320 may ray launch for any terrain or structure model that is representative of the three-dimensional space of the area $A_U$ to enable the ray tracer 320 to identify signal paths 322 from a respective location 314 to a satellite 20. Similar to the ray launcher 230, the ray launcher 320 of the precomputer 300 is configured to receive a hypothetical position (e.g., a location 314 within the area $A_U$) and to simulate the path for the signal 22 from a satellite 20 by propagating rays from multiple directions from the hypothetical position (e.g., the location 314). By launching each of the propagated rays in each direction, the ray tracer 320 models whether a particular ray terminates at the known location (e.g., elevation and azimuth) for the satellite 20. When a particular ray terminates at a satellite 20, the ray launcher 320 identifies the ray as a signal path 322. Because the ray launcher 320 performs ray launching for an area $A_U$, the ray launcher 320 generates signal paths 322 for each location 314 that may include line of sight signal paths 322, $322_{LOS}$ and reflected signal paths 322, $322_{REF}$. In order to capture all potential signal paths 322, the ray launcher 320 is configured to launch rays, for each location 314, for each azimuth at each elevation. Here, the ray launcher 320 may propagate rays radially outward from each location 314 from zero to about ninety degrees elevation at each azimuth angle from zero to three hundred and sixty degrees.

The modeler 330 is configured to receive the signal paths 322 from the ray launcher 320 and to generate a space-efficient, yet comprehensive representation of the signal paths 322 identified by the ray launcher 320 (e.g., the signal path representation 302). The signal path representation 302 will be communicated to the device 110 and, as such, it is a size-conscientious representation For example, when the device 110 sends a request 160 for a particular position to the precomputer 300, the precomputer 300 matches the position to a location 314 and responds to the request 160 with the signal path representation 302 for the location 314 that matches the requested position. Since these requests 160 may be happening on a frequent basis when the device 110 uses the precomputer 300 for localization, the modeler 330 tries to generate a representation size that does not slow down localization and result in a poor user experience.

In some examples, the modeler 330 generates the representation 302 to represent the signal paths 322 at a single location 314 tor all satellites or some designated subset thereof. For instance, FIGS. 3A and 3B illustrate a representation 302 for a particular location 314. Because the ray launcher 320 has generated the signal paths 322 for each azimuth per each elevation (e.g., rounded to the nearest integer degree), the modeler 330 generates a representation that conveys all azimuths and elevations. In some examples, the modeler 330 generates the representation 302 for each location 314 by differentiating reflected signal paths $322_{REF}$ and line of sight signal paths $322_{LOS}$. Once the modeler 330 identifies all of the reflected signal paths $322_{REF}$, the modeler 330 discretizes all of the reflected signal paths $322_{REF}$ into one or more azimuth ranges 332. Discretizing refers to a technique of converting data into a finite set of intervals and associating each interval some specific data value. Here, the discretization process discretizes reflected signal paths $322_{REF}$ into azimuth ranges 332. For instance, FIGS. 3A and 3B depict three azimuth ranges 332, 332a-c where a first azimuth range 332a corresponds to 280-330 degrees, the second azimuth range 332b corresponds to 70-190 degrees, and the third azimuth range 332c corresponds to 25-70 degrees. The modeler 330 focuses on reflected signal paths $322_{REF}$ because the lack of any azimuth range 324 within the representation 302 (or blank space) may be inferred to be line of sight signal path $322_{LOS}$. Therefore, the blank space or negative is able to convey information about a type of signal path just as the positive space (i.e., azimuth ranges 324). This allows compression techniques to compress or remove the blank space, while enabling the blank space to still be meaningful with respect to how signal paths 322 are occurring at a particular location 314.

In some implementations, for each azimuth range 332, the modeler 330 determines one or more transition elevations 334 where a transition elevation 334 corresponds to a degree of elevation (e.g., rounded to the nearest degree) that a reflected signal path $322_{REF}$ transitions to a line of sign signal path $322_{LOS}$. When the modeler 330 determines one or more transition elevations 334, the modeler 330 may include the one or more transition elevations 334 in the representation 302. In other words, in an area $A_U$ (e.g., an urban area), although buildings 30 may be tall, there is likely an elevation where the signal path becomes unobstructed to a satellite 20. Here, the elevation where the signal path 322 changes from being reflected to line of sight is referred to as the transition elevation 334. Due to the nature of an urban environment 100, it may often be the case that reflected signals $322_{REF}$ within the same azimuth range 332 are reflecting off of the same structures. Therefore, the transition elevation 334 may also be discretized over the each azimuth range 332. For example, FIGS. 3A and 3B illustrate the first azimuth range 332a having a first transition elevation of 334, 334a, the second azimuth range 332, 332b having a second transition elevation 334, 334b, and the third azimuth range 332, 332c having a third transition elevation 334, 334c. When discretizing, there may be slight variances among reflected signal path $322_{REF}$ within an azimuth range 332, but the discretization process may represent a range for a set of values as a specific value. For example, the discretization process represents an interval of transition elevations 334 as a single value. In other words, the discretization process may be tuned for particular intervals or to represent intervals according to particular values. As an example, the first, azimuth range 332 may include three reflected signal paths $322_{REF}$ with transition elevations 334 of 42 degrees, 57 degrees, and 49 degrees. Here, the discretization process may represent any transition elevation 334 between 40-60 degrees elevation as 50 degrees.

Referring to FIG. 3B, the modeler 330 may also generate the representation 302 for a particular location 314 with an indication of the excess path length 24 for each reflected signal path $322_{REF}$. For example, the modeler 330 generates the representation with polygon regions whose size and/or coloration corresponds to an excess path length 24. Much like the azimuth range 332 and the transition elevation 334, the modeler 330 may also discretize the excess path lengths of the reflected signal paths $322_{REF}$. For association, this process is somewhat similar to the preprocessing of aggregating and correlating signal paths at the signal mapper 200. The aggregation/correlation technique are generally effective because more than one signal path 22 may be in close proximity and have a similar excess path length 24. Here, the modeler 330 takes a similar approach for the representation 302 and uses discretization and/or polygonal regions to represent similar excess path lengths 24 that occur within the same azimuth range 332. In some examples, the modeler 330 discretizes the excess path lengths 24 for the reflected signal paths $322_{REF}$ using voronoi-based compression to generate the discretized excess path lengths as polygonal representations.

As previously stated, the modeler 330 generally aims to generate a representation 302 that may be easily communicated to the device 110. In some examples, the representation 302 is configured to be stored as a sparse data array. As a sparse data array, the elements that are zero for the sparse data array may correspond to the negative space of the representation 302. For instance, zero values in the sparse data array indicate a line of sight signal path $322_{LOS}$ and also the lack of any reflected signal path $322_{REF}$ (i.e., reflected signal paths $22_{REF}$ are positively represented in the representation 302). By the representation 302 having a sparse data array data structure, the representation 302 may also be compressible, allowing the representation 302 to be communicated in an even smaller size to the device 110.

Figure 4:
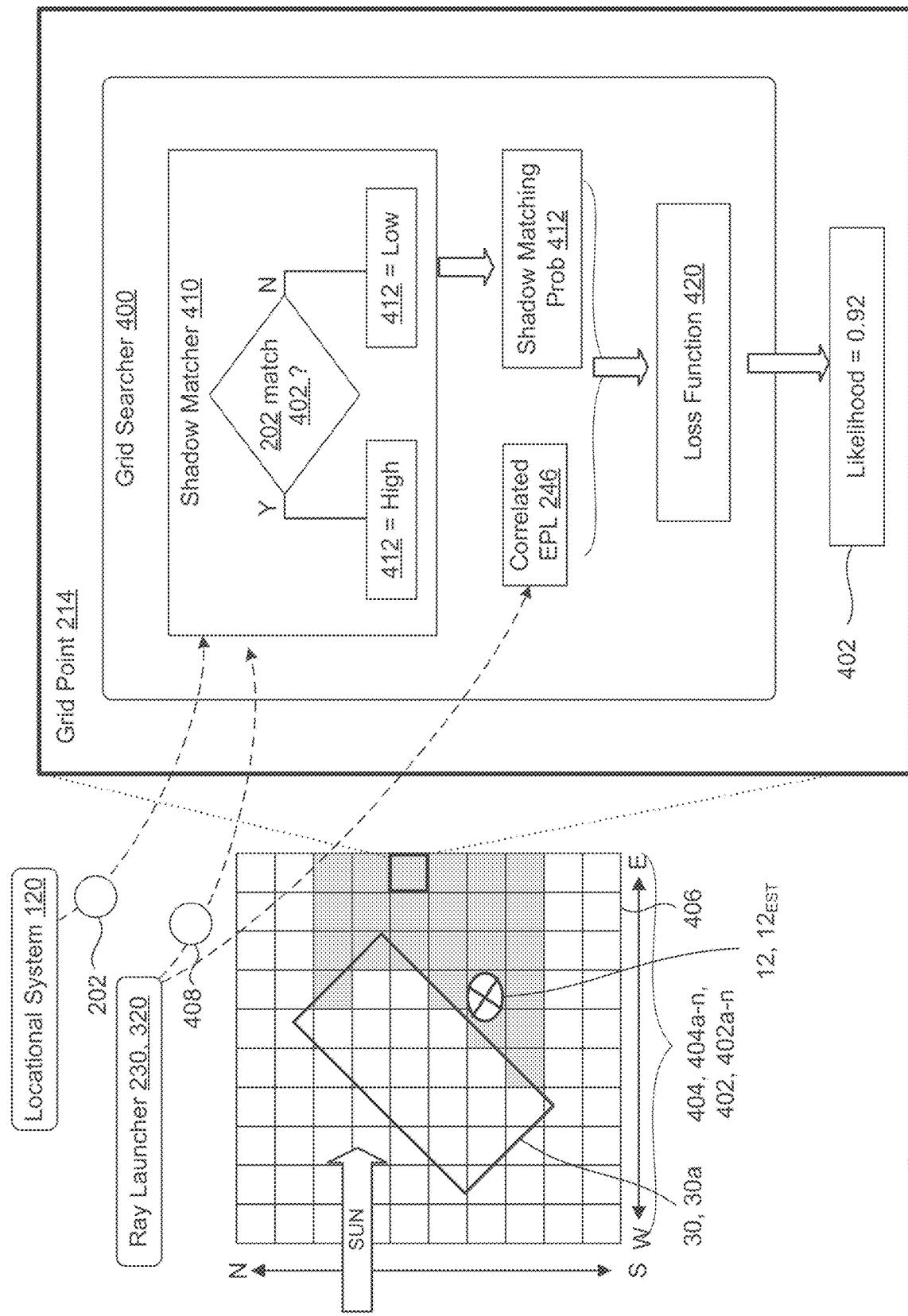
FIG. 4 is a schematic view of an example grid searching using a compound loss function.

Although signal modeling and more particularly signal path length modeling (e.g., by the signal mapper 200 or the precomputer 300) may independently be an approach to identify the actual location $12_A$ of the receiver 114, this approach may also be combined with other approaches with the intent to further improve the identification of the actual location $12_A$ of the receiver 114. Referring to FIG. 4, a grid searcher 400 uses a compound loss function (e.g., shown as loss function 420) to generate an overall probability 402 for each candidate location 404 in a search grid 406 where the overall loss function incorporates more than one loss function front more than one GNSS localization technique (e.g., shadow matching, path length calculating Doppler effect, environment etc.). Generally each loss function of a particular GNSS localization technique is able to independently generate a likelihood or probability of the receiver 114 being at a particular position based on predicted measurements at the particular position in comparison to measured GNSS signal data 202. By incorporating more than one loss function, the grid searcher 400 is able to construct a grid 406 of probabilities 402 where each candidate location 404 of the grid 406 has a probability 402 that it is the actual location $12_A$ of the receiver 114 based on more than one underlying probability or likelihood. This compound approach therefore enables the grid searcher 400 to be more robust by not relying on a single type of probability to determine the actual location $12_A$ of the receiver 114. Moreover this technique may reduce the number of occurrences where a GNSS localization technique appears to generate multiple locations as potentially being the actual location $12_A$.

With continued reference to FIG. 4, the grid searcher 400 includes a shadow matcher 410 and a loss function 420. Here, the shadow matcher 410 is configured to generate a shadow matching probability 412 (i.e., a first probability using the GNSS localization technique of shadow matching) that a candidate location 404 may correspond to the actual location $12_A$. In some examples, the shadow matcher 410 receives or obtains measured GNSS signal data 202 (e.g., from the receiver 114) From the measured GNSS signal data 202, the shadow matcher 410 is configured to identify a signal strength for a signal 22 from a particular satellite 20 based on the measured GNSS signal data 202. Based on the signal strength for a signal 22 from a particular satellite 20, the shadow matcher 410 determines one or more candidate locations 404 where the receiver 114 may exhibit a signal strength for the particular satellite 20 that corresponds to the identified signal strength (e.g., from the measured GNSS signal data 202). Using this determination, the shadow matcher 410 may generate a shadow matching probability 412. For instance, the shadow matcher 410 generates a probability 412 at each candidate location 404 that identifies how closely the signal strength of the measured GNSS signal data 202 matches an expected signal strength for the receiver 114 at a respective candidate position 404. In some examples, the shadow matcher 410 determines whether the GNSS signal data 202 (e.g., a $C/N_0$ measurement) indicates a strong or a weak signal 22 for a particular satellite 20. When the GNSS signal data 202 indicates a strong signal 22 for a particular satellite 20, the shadow matcher 410 identifies a portion of the grid 406 (e.g., one or more candidate locations 404) where the signal 22 for that particular satellite 20 would be strong. In contrast, when the GNSS signal data 202 indicates a weak signal 22 for a particular satellite 20, the shadow matcher 410 identifies a portion of the grid 406 where the signal 22 for that particular satellite 20 would be weak. In this example, where the shadow matcher 410 identifies a portion of the grid 406 (e.g., one or more candidate positions) with an expected signal strength (e.g., a high signal strength) for a particular satellite 20 that matches a measured signal strength (e.g., a high measured signal strength) for the particular satellite 20 (e.g., from the measured GNSS data 202), the shadow matcher 410 generates a high probability to represent that the signal strengths have a high correlation. In contrast, when the shadow matcher 410 identifies a portion of the grid 406 (e.g., one or more candidate positions 404) with an expected signal strength for a particular satellite 20 that does not match a measured signal strength for the particular satellite 20, the shadow matcher 410 generates a low probability to represent that the signal strengths have low correlation.

In some configurations, the shadow matcher 410 has access to or is configured with a structure map or terrain map (e.g., of the environment 100) to enable the shadow matcher 410 to identify a signal strength (e.g., expected, anticipated, or predicted signal strength) for a signal 22 at a particular candidate location 404. With the structure map, the shadow matcher 410 may identify objects within the structure map that would obstruct a line of sight for a particular satellite 20. Based on this identification, the shadow matcher 410 is configured to classify each candidate position 404 based on whether a respective object obstructs the line of sight from a candidate position 404 to the particular satellite 20. Here, the shadow matcher 410 may generate a predicted signal strength (also referred to as an expected signal strength) for a signal 22 at a candidate position 404 (e.g., each candidate position) based on the classification of whether the respective object obstructs the line of sight from the candidate position 404 to the particular satellite 20. For instance, a satellite signal 22 is weak at a candidate position 404 when an object such as a building 30 obstructs a line of sight signal path $22_{LOS}$ to the candidate position 404. To illustrate, in FIG. 4, assuming that the particular satellite 20 faces the direction of the sun, a receiver 114 that measures a weak signal 22 for its measured GNSS signal data 202 likely exists in the grey candidate location 404 because the particular satellite 20 is blocked by the building 30. Here, the shadow matcher 410 identifies one or more candidate locations 404 that correspond to the signal strength and generates a shadow matching probability 414 that is greater for the greyed candidate locations 404 than the white candidate locations 404.

In some implementations, the shadow matcher 410 works in conjunction with ray launching to identify the candidate locations 404 that would have the appropriate signal strength. In some examples, a ray launcher 230, 320 provides the shadow matcher 410 with a probability of line of sight value for each candidate location 404 in the grid 406. With a probability of line of sight value, the shadow matcher 410 may determine an expected signal strength for a signal 22 from a particular satellite 20 at a given candidate position 404 based on the probability of line of sight value. For instance, when the probability of line of sight value for a particular satellite 20 at a candidate position 404 is high, the shadow matcher 410 determines that the expected signal strength for that satellite 20 would be high at this position 404 due to the high likelihood that, at the candidate position 404, the receiver 114 receives a line of sight signal $20_{LOS}$. In other words, line of sight signals $20_{LOS}$ exhibit higher signal strength than redirected signals $20_{REF}$. In contrast, when the probability of line of sight value for a particular satellite 20 at a candidate position 404 is low, the shadow matcher 410 determines that the expected signal strength for a signal 20 from that satellite 20 would be low at this position 404 due to the low likelihood that, at the candidate position 404, the receiver 114 receives a line of sight signal $20_{LOS}$ (i.e., the receiver 114 likely receives a redirected signal $20_{REF}$ rather than a line of sight signal $20_{LOS}$). This may be advantageous because it is relatively easy (i.e., computationally affordable) for a ray launcher 230, 320 to output and also simplifies processing for the shadow matcher 410.

The loss function 420 is configured to receive two or more loss functions and, for each candidate location 404, to generate an overall probability 402 based on the input probabilities/loss functions. For instance, the loss function 420 receives a first probability from a first GNSS localization technique (e.g., a shadow matching technique) and a second probability front a second GNSS localization technique (e.g., from an EPL computation technique). In the example of FIG. 4. the loss function 420 receives a shadow matching probability 412 (e.g., representing a shadow matching loss function) and a pseudorange residual loss function based on the excess path length 24 determined by the ray launcher 230, 320. Here, the pseudorange residual loss function refers to a difference between a measured pseudorange error (e.g., part of the measure GNSS signal data 202) and an expected pseudorange error at a given candidate location 404. The expected pseudorange error is based on an excess path length while the measured pseudorange error is the difference between the measured pseudorange and the expected pseudorange at the candidate location 404. For instance, to generate an expected pseudorange at a candidate location 404, the excess path length for a candidate location 404 is combined with a distance between the candidate location 404 and the satellite 20 based on a line of sight signal $22_{LOS}$. Here, the loss function 420 may communicate with the ray launcher 230 to receive an excess path length 24 by ray launching. FIG. 4 illustrates the grid searcher 400, and more specifically, the loss function 420 receives the correlated excess path length 246 from the launcher 230. By using the correlated excess path length 246 from the launcher 230, the grid searcher may avoid further processing since the correlated excess path length 246 is a single representation of an excess path length 24 for a candidate position 214. Additionally or alternatively, the compound loss function 420 may receive other loss functions. For instance, the compound loss function 420 receives a prior knowledge loss function that uses prior knowledge of previous locations and penalizes candidate locations 404 that are greater than some threshold distance (e.g., too far) from the previous location. In some examples, the compound loss function 420 receives two or more probability grids corresponding to a loss function and overlays the two or more probability grids to construct the grid 406 of probabilities 402.

Referring back to FIG. 1, the locational system 120 is configured to communicate with a client 150 of the locational system 120. In some examples, the client 150 refers to entity that produces hardware for the receiver 114 (e.g., a GNSS chipset producer). The locational system 120 may provide feedback 122 to the client 150 regarding the performance of the GNSS chipset or improvements to the chipset. With the feedback 122, the client 150 may be amenable to improving their devices based on the knowledge provided. Some of the feedback 122 that may be communicated to the client 150 includes computed values that improve the localization accuracy of the receiver 114, the probability that each visible (i.e., available) satellite is line of sight as determined by the ray launcher 230, excess path length corrections from the signal mapper 200 or precomputer 300, and reflecting plane information for reflected signal paths $322_{REF}$ (e.g., a vertical height representation for how signal paths $322_{REF}$ are reflecting). The client 150 may use this feedback 122 to upgrade or to further assist initial computations on the chipset that fail to take into account reflected signal $22_{REF}$. For instance, with the probability that a signal is a line of sight signal $22_{LOS}$, the entity may be able to give an appropriate weight to pseudoranges, to de-weight Doppler for better velocity estimation, and/or to smooth pseudoranges. With the excess path length correction, the client 150 may be able to incorporate excess path lengths to correct the line-of-sight assumptions that lead to locational inaccuracy. Information regarding the reflecting plan may be used to correct the velocity calculation by the receiver 114.

In some examples, a grid-based search for the location of the receiver 114 can have some downsides. For instance, when the locational system 120 determines a single excess path length 24 for each satellite 20, the grid-based method may result in more than one best candidate within the grid. For example, there may be several locations where the locational system 120 determines a similar excess path length 24. In situations like these, the locational system 120 may avoid multiple solutions for the actual location $12_A$ of the receiver 114 by employing a full channel modeler 500. The full channel modeler 500 may reduce or minimize a situation with multiple solutions by modeling multiple signal paths simultaneously. For instance, the full channel modeler 500 may evaluate multiple excess path lengths 24 simultaneously for each satellite 20 rather than a signal excess path length 24. Here, in order to model a full channel of signal paths for a satellite 20, the full channel modeler 500 takes advantage of a locational system 120 that is capable of receiving signals 22 in a high resolution frequency band of a radio spectrum. In other words, conventionally satellites 20 broadcasted signals 22 in an L1 frequency band of the L-band designated for GNSS communication. Yet more recently, satellites 20 have evolved to broadcast signals 22 in an L5 frequency band of the L-band designated for GNSS communication. For comparison, a GNSS signal in the L5 frequency band has ten times the resolution of the corresponding signal on the L1 frequency band With this high resolution, redirected signals 22 may appear to be much more distinct to a locational system 120; allowing a full channel modeler 500 to model a full channel of signals 22 from each satellite 20 and to compare the modeled full channel of signals 22 to GNSS signal measurements (e.g., GNSS signal data 202) at the higher resolution. Here, a full channel of signals 22 refers to all possible paths front a particular satellite 20 to the receiver 114 in a frequency band of interest (e.g., the L5 band). By accurately modeling a full channel of signals 22, the full channel modeler 500 enables localization by the locational system 120 to have greater resolution and therefore a lower likelihood to produce multiple solutions for the actual location $12_A$ of the receiver 114.

Figure 5A:
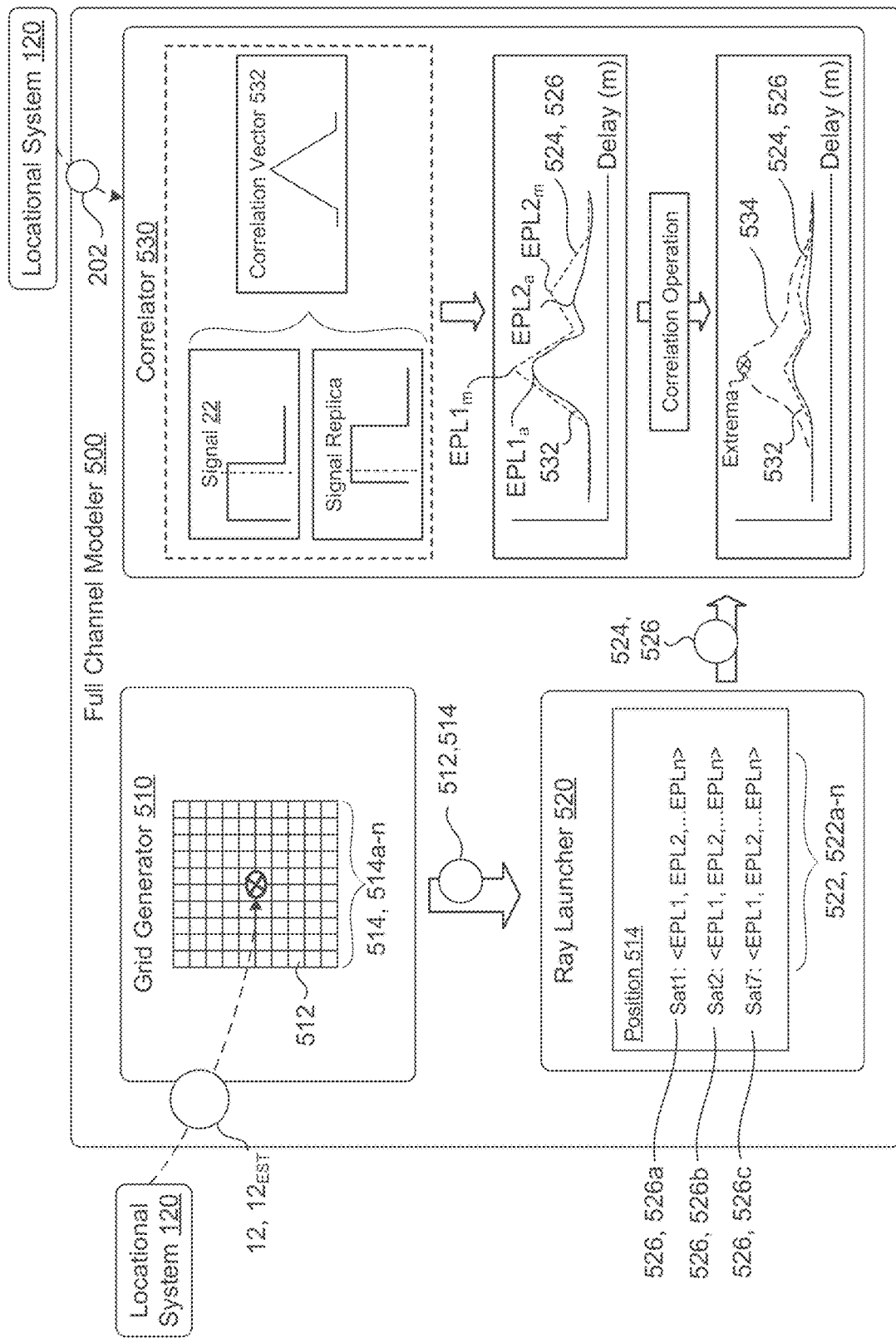
FIGS. 5A and 5B are schematic views of example full channel modelers for signal path modeling with high resolution signals.
Figure 5B:
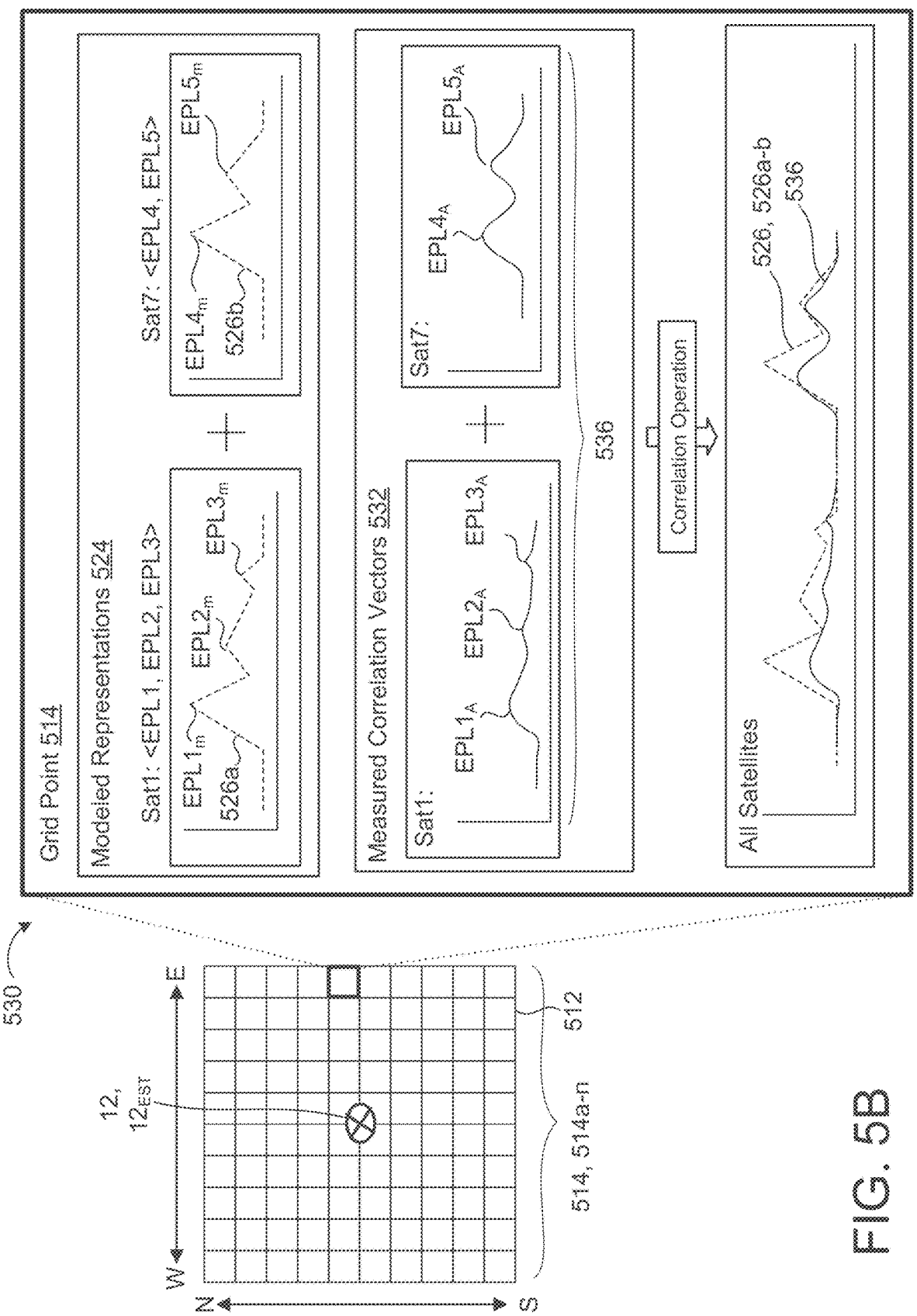

Referring to FIGS. 5A and 5B, the full channel modeler 500 generally includes a grid generator 510 and a ray launcher 520. Here, the grid generator 510 functions similarly to the grid generator 210 of the on-device signal mapper 200 and/or the grid generator 310 of the precomputer 300. The grid generator 510 is configured to receive an estimated location $12_{EST}$ (also referred to as an estimated position) from the locational system 120. Generally, the estimated location $12_{EST}$ refers to any representation of position, such as any projected or Cartesian coordinates. The estimated location $12_{EST}$ may correspond to a location 12 where the receiver 114, based on conventional GNSS localization system, believes the receiver 114 to be located (e.g., the conventional location $12_{CON}$ on based on a line of sight assumption for the signal 22). In other examples, the grid generator 510 generates the estimated location $12_{EST}$ itself (e.g., based on conventional GNSS localization). In either approach, with the estimated location $12_{EST}$, the grid generator 510 generates a plurality of positions about the estimated location $12_{EST}$ (i.e., adjacent to or radiating outward from the estimated location $12_{EST}$) where each position of the plurality of positions corresponds to a candidate position 514 that may represent the actual location $12_A$ of the receiver 114. In some examples, in order to ensure that each position about the estimated location $12_{EST}$ is systematically analyzed, the grid generator 510 generates the plurality of the candidate positions 514 as a grid 512 where each point in the grid 512 represents a candidate position 514. For instance, FIG. 5A illustrates a grid 212 where the center of the grid 512 is the estimated location $12_{EST}$ with candidate positions 514 generated in each direction about the estimated location $12_{EST}$ (e.g., northerly, southerly, easterly, and westerly). The grid 512, or, more generally the plurality of candidate positions 514, represents potential locations where the receiver 114 may be located on the plane parallel to Earth's surface.

Also similar to the signal mapper 200 and the precomputer 300, the full channel modeler 500 includes the ray launcher 520. Here, the ray launcher 520 may ray launch using any terrain or structure model that is representative of the three-dimensional space of the area (e.g., the grid area) to enable the ray launcher 520 to identify signal paths 522 from a respective position 514 to a satellite 20. Similar to the ray launchers 230, 320, the ray launcher 520 is configured to receive a hypothetical position (e.g., a position 514 within the area or the grid 512) and to simulate the path for the signal 22 from a satellite 20 by propagating rays from multiple directions from the hypothetical position (e.g., the location 314). By launching each of the propagated rays in each direction, the ray launcher 520 models whether a particular ray terminates at the known location (e.g., elevation and azimuth) for the satellite 20. When a particular ray terminates at a satellite 20, the ray launcher 520 identifies the ray as a signal path 522. The ray launcher 520 may generate signal paths 522 for each position 514 that may include line of sight signal paths and/or redirected signal paths (e.g., reflected signal paths). In some configurations, in order to capture all potential signal paths 522, the ray launcher 520 is configured to launch rays, for each position 514, for each azimuth at each elevation (or some degree thereof).

As a result of ray launching, the ray launcher 520 is configured to determine one or more candidate signal paths 522, 522a-n that may correspond to signal(s) 22 received by the receiver 114. For each candidate signal path 522, the ray launcher 520 may also generate path characteristics (e.g., much like the ray launcher 230). Some examples of path characteristics includes path type (e.g., line of sight or reflected), attenuation along the candidate signal path 522 (e.g., a number of reflections that occur during the path), excess path length 24, a sum of the scattering angles along the candidate signal path 522, and other scattering information. Here, instead of optimizing the candidate signal paths 522 like the optimizer 240, the ray launcher 520 of the full channel modeler 500 is configured to generate a modeled representation 524 of all of the candidate signal paths 522 at a given position 514. For instance, the ray launcher 520 generates an excess path length vector 526 as the modeled representation 524 where the excess path length vector 526 includes an excess path length 24 for each candidate signal path 522 identified by the ray launcher 520. To illustrate, FIG. 5A depicts that, at a given position 514, the ray launcher 520 identifies multiple candidate signal paths 522, 522a-n for each satellite 20. Here, there are three satellites 20 (e.g., shown as Sat1, Sat2, Sat7) that appear available to the receiver 114 based on ray launching and each satellite 20 may have its own excess path length vector 526, 526a-c that includes one or more candidate signal paths 522 represented by their excess path length 24. By generating a representation 524, such as the excess path length vector 526 for each satellite 20 at a particular position 514, the full channel modeler 500 is able compare the modeled representation 524 (e.g., the excess path length vector 526) to actual GNSS measurements (e.g., GNSS signal data 202) received by the locational system 120 (e.g., the receiver 114). Since the locational system 120 uses the full channel modeler 500 when the received signals 22 are of high resolution (e.g., in the L5 band), the modeler 500 is able to compare a representation 524 of multiple candidate signal paths 522 to multiple GNSS signal measurements. Based on this comparison for all positions 514 (e.g., of a grid 512 of candidate positions 514), the full channel modeler 500 determines a position 514 of all the potential positions 514 with a best fit between the modeled representation 524 and the actual GNSS measurements. Here, the modeler 500 may identify the position 514 with the best fit (or closest match) as the likely actual location $12_A$ of the receiver 114. In some examples, the modeler 500 is configured to generate a likelihood for each position 514 based on the comparison between the modeled representation 524 and the actual GNSS measurements. In these examples, the modeler 500 may select the position 514 with the greatest likelihood of all the positions 514 as the actual location $12_A$ of the receiver 114.

In some examples, such as FIG. 5A, the modeler 500 also includes a correlator 530 that is configured to perform the comparison between the modeled representation 524 from the ray launcher 520 and the actual GNSS measurements. Here, the correlator 530 may adapt conventional correlation techniques used to determine a pseudorange for a signal 22 to perform the comparison between the modeled representation 524 from the ray launcher 520 and the actual GNSS measurements. Generally speaking, conventional techniques measure the range from a satellite 20 to the receiver 114, known as the pseudorange, by detecting a peak of a correlation result between a received signal 22 and a locally produced replica of the received signal 22 and the delay that corresponds to the peak. In the conventional approach, the pseudorange corresponds to the first detected peak or first measured peak of this correlation result. Here, even though multiple peaks may be present based on the GNSS measurements, the conventional approach typically only considers the first detected or measured peak as the pseudorange while any trailing or subsequent peaks, which arc generally from redirected signal paths, are generally ignored. By ignoring other peaks, the conventional approach ignores correlation information that may be valuable to determine an actual location $12_A$ of the receiver 114. For instance, this ignored correlation information may provide additional information to perform a more in-depth comparison between the modeled representation 524 from the ray launcher 520 and the actual GNSS measurements. By performing a more in depth comparison, the modeler 500 may be able to differentiate two or more potential locations for the receiver 114.

The correlator 530 is configured to receive GNSS signals 22 from a satellite 20 and to perform a correlation operation to generate a measured correlation vector 532 based on GNSS signal measurements (e.g., GNSS signal data 202) for the received GNSS signals from the satellite 20. For instance, the correlation vector 532 refers to a response of all possible signal delays during a correlation operation on one or more signals 22 (e.g., all signals from a particular satellite 20). Here, as shown in the dotted box of FIG. 5A, the correlation operation produces a local copy of the received signal(s) 22 and shifts the local copy along the received signal(s) 22 until the correlation operation identifies one or more peaks (e.g., shown as one peak in the dotted box for simplification). When a signal 22 has an L5 band frequency, the correlator 530 receives the signal 22 with a spreading code that has a higher rate titan the spreading code of an L1 frequency signal. With a higher rate, the amount that the correlator 530 has to shift the local copy (e.g., corresponding to a delay) to identify a peak is generally less when compared to a lower rate, which means the correlator 530 is able to potentially identify a greater number of discrete peaks over a period of time front the signals 22 received from a particular satellite 20.

In some examples, the correlator 530 determines a measured correlation vector 532 for each satellite 20 (e.g., available satellite) in order to compare one or more measured correlation vectors 532 to the modeled representation 524. In some implementations, the correlator 530 is configured to convert the modeled representation 524 into a format that promotes the comparison between a measured correlation vector 532 and the modeled representation 524. For instance, when the modeled representation 524 is an excess path length vector 526 for a particular satellite 20 at a particular position 514, the correlator 530 may perform a correlation operation between the excess path length vector 526 for the particular satellite 20 at the particular position 514 and a measured correlation vector 532 for the same satellite 20 (i.e. a vector to vector comparison). For example, FIG. 5A depicts the correlator 530 identifying a measured correlation vector 532 that includes two peaks shown as a first actual excess path length $EPL1_A$ and a second excess path length $EPL2_A$ based on the actual received GNSS measurements at the locational system 120. Here, the correlator 530 plots this measured correlation vector 532 and compares the plotted representation of the measured correlation vector 532 to a modeled representation 524 (e.g., excess path length vector 526). In this example, the excess path length vector 526 includes two modeled excess path lengths $EPL1_M$ and $EPL2_M$ that correspond to the candidate signal paths 522 identified by the ray launcher 520. Here, the correlator 530 is configured to perform a correlation operation as a function to identify a difference between the modeled representation 524 and the measured correlation vector 532 for a particular satellite 20 at a particular position 514. In other words, the correlation operation may operate as a loss function that represents or identifies how closely the modeled representation 524 matches the correlation vector 532 at a particular position 514 (i.e., a local loss or best fit function for the position 514).

As can be seen from the example depicted in FIG. 5A, the correlation operation results in a correlation 534 between the modeled representation 524 and the measured correlation vector 532. The correlation 534 may be formed from a variety of statistical approaches that represent the difference or variation between two functions (e.g., the modeled representation 524 and the measured correlation vector 532). These statistical approaches may range from a simple difference to more complicated regression modeling tactics that represent the variance or the standard deviation between two functions (e.g., a residual sum of squares). As an example, FIG. 5A depicts the correlation 534 as a difference between the plotted representations of each of the modeled representation 524 and the measured correlation vector 532. The correlation 534 may identify an extrema such as a maxima (e.g., shown by a point with an "X" in FIG. 5A) that the modeler 500 may use as a representative loss or difference between the modeled representation 524 and the measured correlation vector 532 at a particular position 514. In some configurations, with a representative loss at each position 514 in a grid 512 of candidate positions 514, the modeler 500 may then select a position 514 with the lowest loss as the position 514 where the modeled representation 524 and the measured correlation vector 532 most closely match.

By modeling the entire channel for all satellites 20 at a particular position 514 and comparing this modeled result (e.g., the modeled representation 524) to all of the GNSS signal data received by the receiver 114, the full channel modeler 500 increases the likelihood that the position 514 that the modeler 500 selects is the actual location $12_A$ for the receiver 114 compared to other techniques that may model less than the full channel for each satellite or use less than a full channel to predict the actual location $12_A$ of the receiver 114. In some configurations, the full channel modeling process may allow the locational system 120 to predict the actual location $12_A$ of the receiver 114 from a single satellite 20 without having to necessarily use multiple satellites 20 (like more traditional localization systems). This may be contributed to the fact that the full channel modeling process uses multiple data points when it compares a modeled representation for a satellite 20 to measure signal data for that particular satellite 20.

In some implementations, such as FIG. 5B, instead of performing a correlation operation for each satellite 20 at each position 514, the correlator 530 is configured to concatenate the measured correlation vectors 532 for every satellite 20 available to form a concatenated correlation vector 536 that represents the entire channel of signal measurements. For instance, FIG. 5B illustrates the correlator 530 generating the concatenated correlation vector 536 based on signal measurements that correspond to two satellites 20 (e.g., shown as Sat1 and Sat7) Here, the first satellite Sat1 broadcasted a signal 22 that the receiver 114 receives as three measured peaks (e.g., corresponding to an actual measured excess path length) and the second satellite Sat7 broadcasted a signal 22 that the receiver 114 receives as two measured peaks. Moreover, in order to compare this concatenated correlation vector 536 for all satellites 20 (e.g., all available satellites) to the modeled representation 524 at a particular position 514, the correlator 530 may also concatenate the modeled representation 524 of that particular position 514. For instance, when the modeled representation 524 corresponds to excess path length vectors 526 for multiple satellites 20 at a particular position 514, the correlator 530 concatenates all of these excess path length vectors 526 together for comparison with the concatenated correlation vector 534 for all satellites 20 at the position 514. FIG. 5B depicts the modeled representation 524 including candidate signal paths 522 for the same two satellites 20 (e.g., Sat1 and Sat7) at a given position 514. Here, the modeled representation 524 includes three modeled excess path lengths EPL1-3$_M$ for the first satellite Sat1 and two modeled excess path length EPL4-5$_M$ for the second satellite Sat7. The correlator 530 may then perform the correlation operation (e.g., as a local loss function) for all satellites at a given position 514 to generate a difference between the modeled representation 524 and the measured correlation vectors 532 for all available satellites 20 at a particular position 514. In some examples, the modeler 500 then identifies an actual location 12$_A$ of the receiver 114 as the position 514 where the concatenated correlation vector 536 for all satellites 20 most closely matches the excess path length vector 526, 526a-b for all satellites 20. For example, the modeler 500 uses a global loss function that identifies the actual position 12$_A$ of the receiver 114 as the position 514 among all the positions 514 that has an optimal local loss.

In some configurations, the loss function from the full channel modeler 500 may be combined with other loss functions to identify the actual location 12$_A$ of the receiver 114. For instance, the loss function of the modeler 500 may be incorporated into the loss function 420. In some examples, the loss function of the modeler 500 may be combined or incorporate other loss functions, such as a loss function for signal strength or a loss function based on carrier-to-noise-density ratios. This may allow localization techniques to be compounded for, potentially, greater accuracy and reliability.

Figure 6:
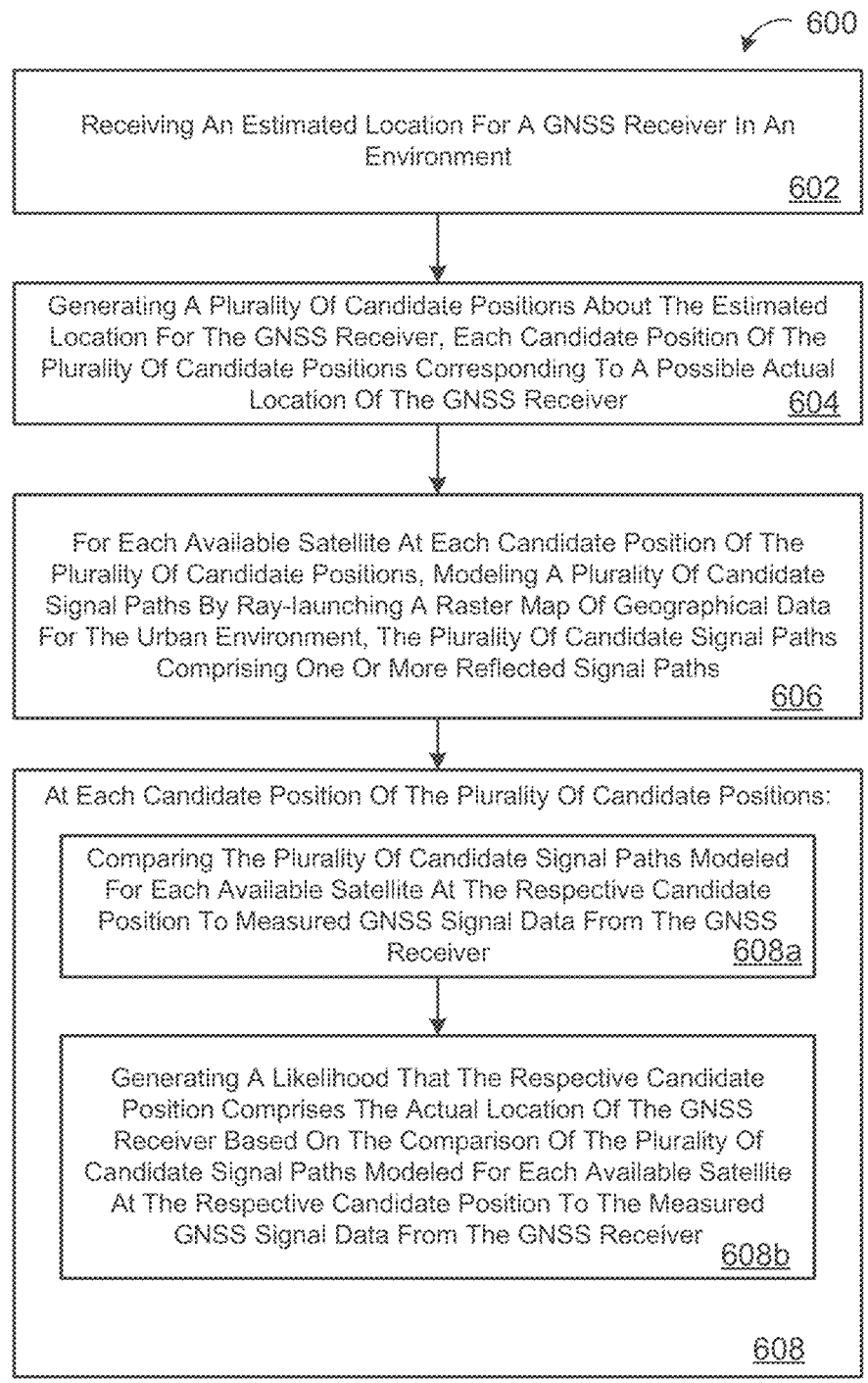
FIG. 6 is a flowchart of an example arrangement of operations for a method of computing signal paths on-device.

FIG. 6 is a flowchart of an example arrangement of operations for a method 600 of computing signal paths on-device. At operation 602, the method 600, at the device 110, receives an estimated location 12$_{EST}$ for a GNSS receiver 114 in an environment 100. At operation 604, the method 600 generates a plurality of candidate positions 214 about the estimated location 12$_{EST}$ for the GNSS receiver 114 where each candidate position 214 of the plurality of candidate positions 214 corresponds to a possible actual location 12$_A$ of the GNSS receiver 114. At operation 606, the method 600, for each available satellite 20 at each candidate position 214 of the plurality of candidate positions 214, models a plurality of candidate signal paths 232 by ray-launching a raster map 226 of geographical data 222 for the environment 100. Here, the plurality of candidate signal paths 232 includes one or more reflected signal paths 232. At each candidate position 214 of the plurality of candidate positions 214, the method 600, at operations 608, 608a-b, compares the plurality of candidate signal paths 232 modeled for each available satellite 20 at the respective candidate position 214 to measured GNSS signal data 202 from the GNSS receiver 114 and generates a likelihood 248 that the respective candidate position 214 includes the actual location 12$_A$ of the GNSS receiver 114 based on the comparison of the plurality of candidate signal paths 232 modeled for each available satellite 20 at the respective candidate position 214 to the measured GNSS signal data 202 from the GNSS receiver 114.

Figure 7:
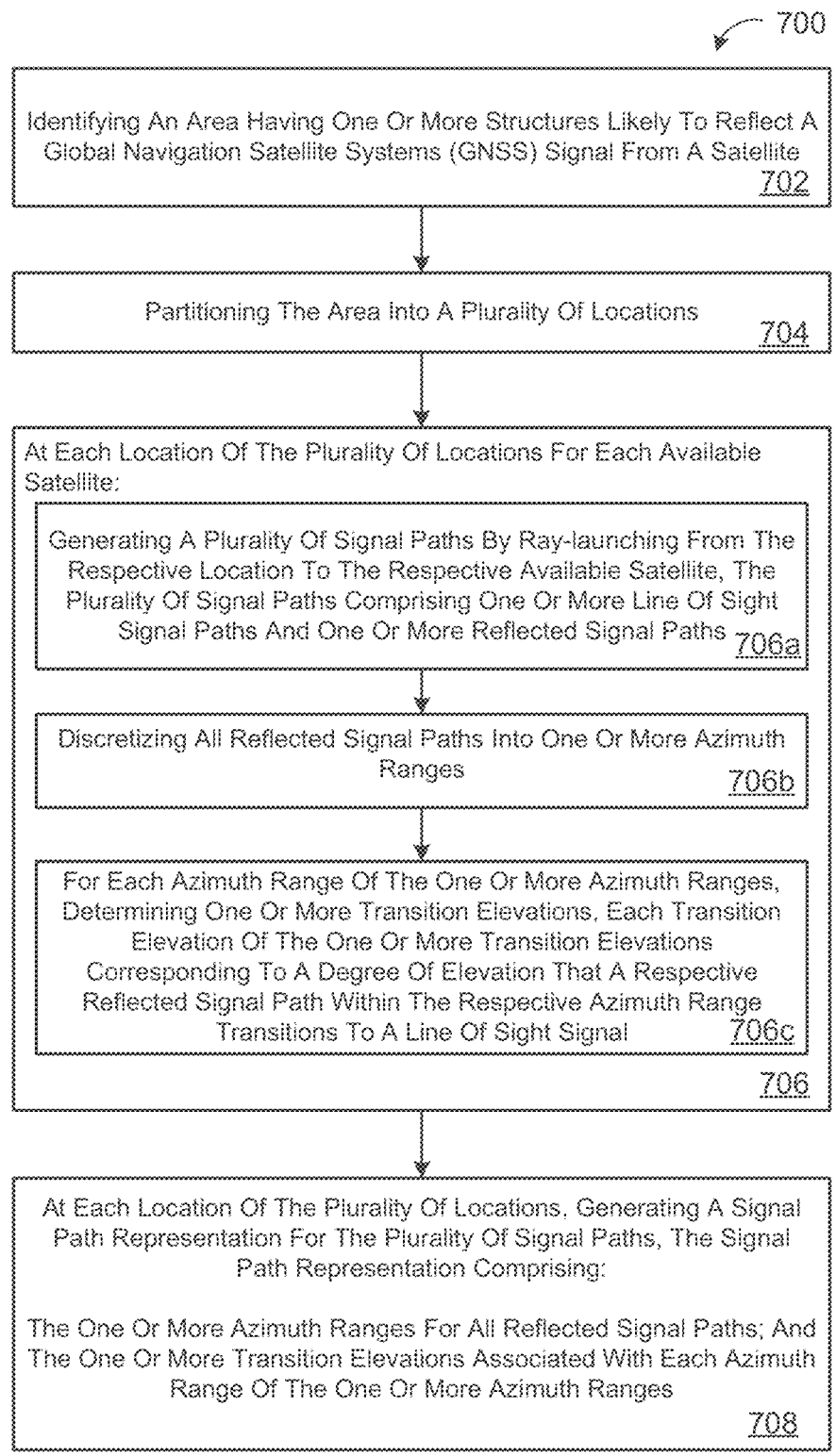
FIG. 7 is a flowchart of an example arrangement of operations for a method of computing signal paths remotely.

FIG. 7 is a flowchart of an example arrangement of operations for a method 700 of computing signal paths remotely. At operation 702, the method 700 identifies an area A$_U$ having one or more structures likely to reflect a Global Navigation Satellite Systems (GNSS) signal 22 from a satellite 20. At operation 704, the method 700 partitions the area A$_U$ into a plurality of locations 314. Operations 706 includes three subsets of operations 706a-c that occur at each location 314 of the plurality of locations 314 for each available satellite 20. At operation 706a, the method 700 generates a plurality of signal paths 322 by ray-launching from the respective location 314 to the respective available satellite 20 where the plurality of signal paths 322 includes one or more line of sight signal paths 322, 322$_{LOS}$ and one or more reflected signal paths 322, 322$_{REF}$. At operation 706b, the method 700 discretizes ail reflected signal paths 322$_{REF}$ into one or more azimuth ranges 332 At operation 706b, for each azimuth range 332 of the one or more azimuth ranges 332, the method 700 determines one or more transition elevations 334 where each transition elevation 334 of the one or more transition elevations 334 corresponds to a degree of elevation that a respective reflected signal path 322$_{REF}$ within the respective azimuth range 332 transitions to a line of sight signal. At each location 314 of the plurality of locations 314, at operation 708, the method 700 generates a signal path representation 302 for the plurality of signal paths 322 where the signal path representation 302 includes the one or more azimuth ranges 332 for all reflected signal paths 322$_{REF}$ and the one or more transition elevations 334 associated with each azimuth range 332 of the one or more azimuth ranges 332.

Figure 8:
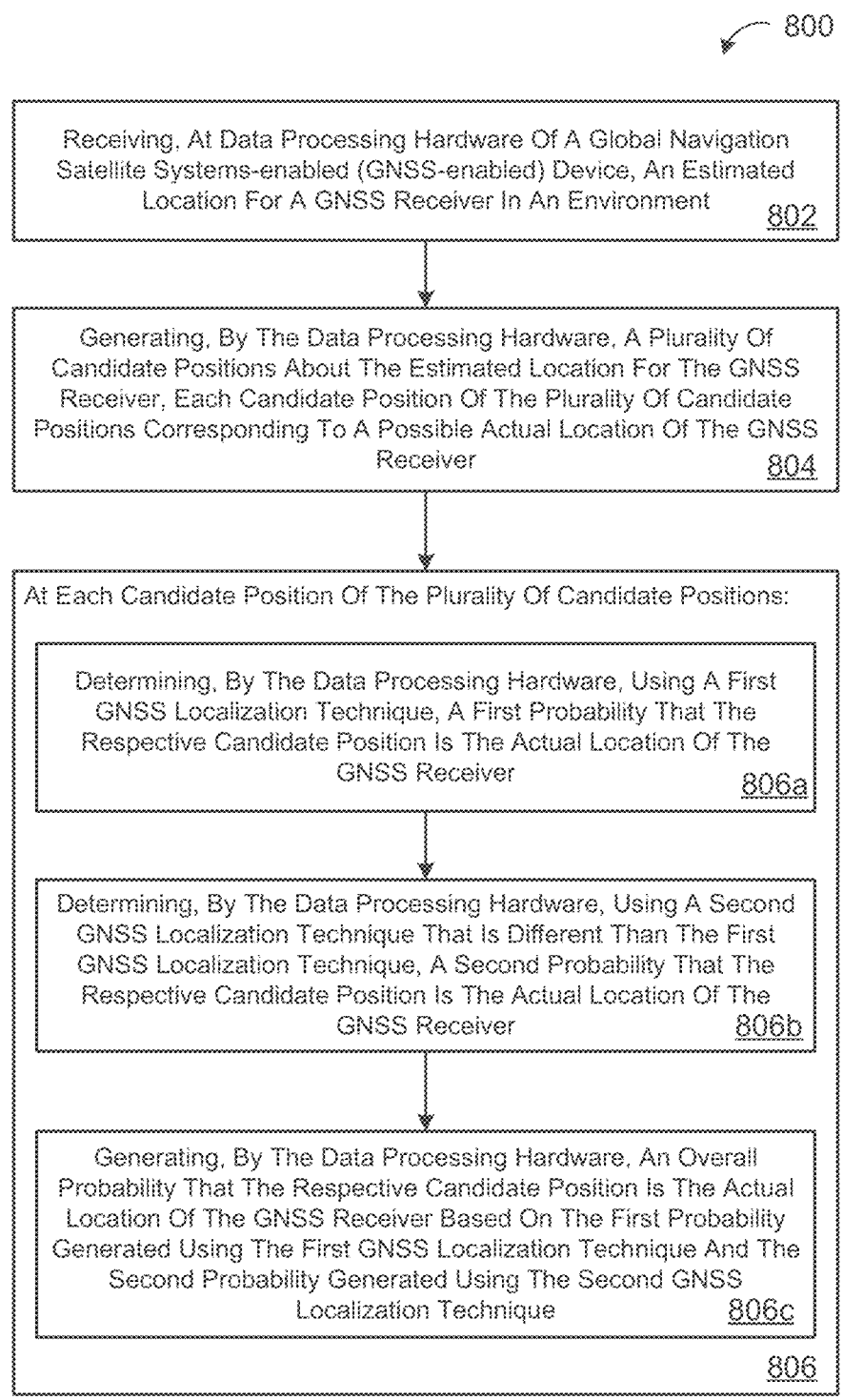
FIG. 8 is a flowchart of an example arrangement of operations for a method of generating a locational likelihood using GNSS localization techniques.

FIG. 8 is a flowchart of an example arrangement of operations for a method 800 of generating a locational likelihood using multiple GNSS localization techniques. At operation 802, the method 800 receives, at GNSS-enabled device 110, an estimated location 12$_{EST}$ for a GNSS receiver 114 in an environment 100. At operations 804, the method 800 generates a plurality of candidate positions 404 about the estimated location 12$_{EST}$ for the GNSS receiver 114 where each candidate position 404 of the plurality of candidate positions 404 corresponding to a possible actual location 12$_A$ of the GNSS receiver 114. Operation 806 includes three sub-operations 806, 806a-c that occur at each candidate position 404 of the plurality of candidate positions 404 about the estimated location 12$_{EST}$ for the GNSS receiver 114. At operation 806a, the method 800 determines, using a first GNSS localization technique (e.g., a shadow matching technique), a first probability (e.g., the shadow matching probability 412) that the respective candidate position 404 is the actual location 12$_A$ of the GNSS receiver 114. At operation 806b, the method 800 determines, using a second GNSS localization technique that is different than the first GNSS localization technique, a second probability (e.g., represented by the pseudorange residual loss function) that the respective candidate position 404 is the actual location $12_A$ of the GNSS receiver 114. At operation 806c, the method 800 generates an overall probability 402 that the respective candidate position 404 is the actual location $12_A$ of the GNSS receiver 114 based on the first probability (e.g., the shadow matching probability 412) generated using the first GNSS localization technique and the second probability generated using the second GNSS localization technique.

Figure 9:
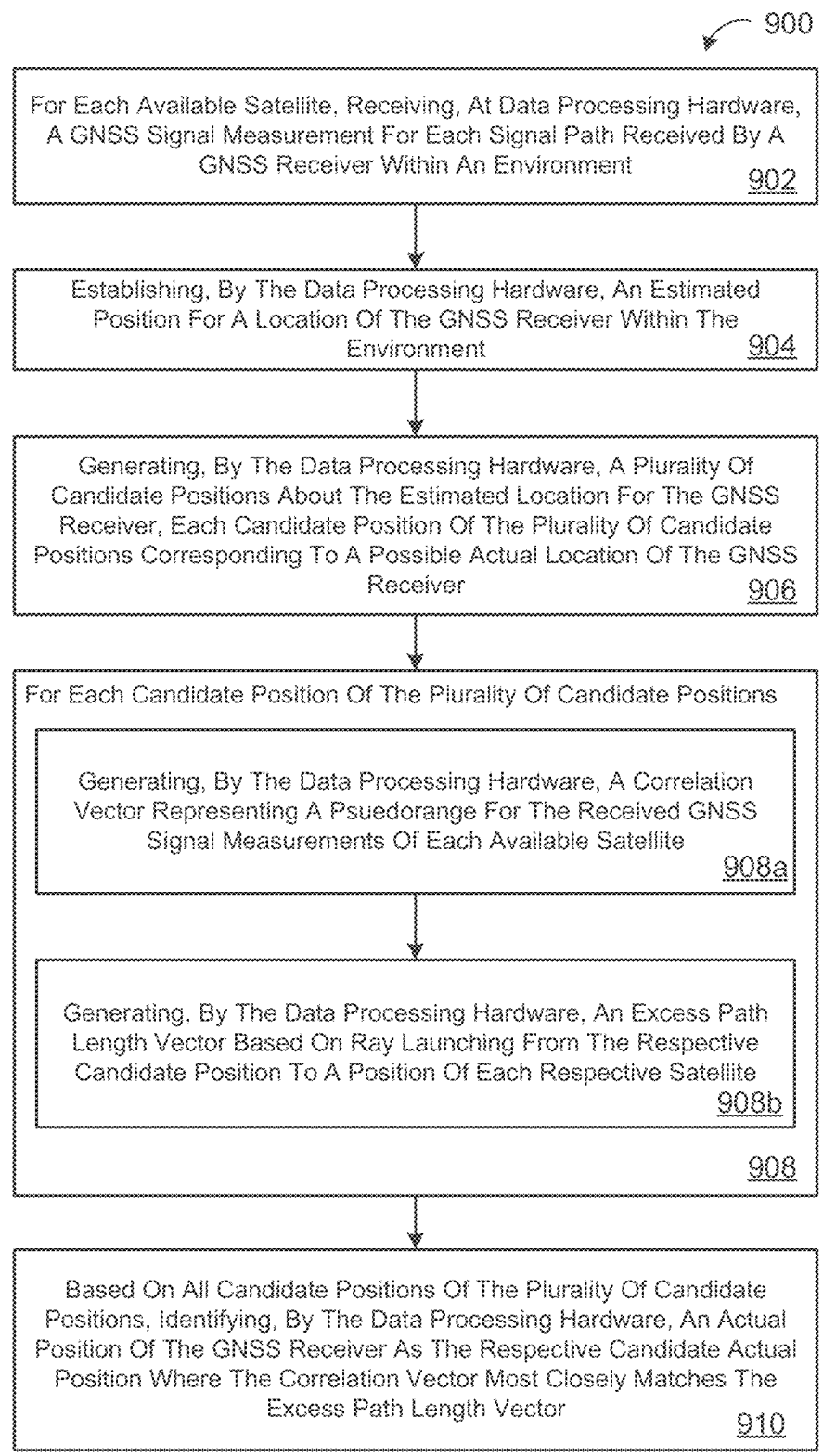
FIG. 9 is a flowchart of an example arrangement of operations for a method of modeling a full channel of signals.

FIG. 9 is a flowchart of an example arrangement of operations for a method 900 of modeling a full channel of signals. At operation 902, for each available satellite 20, the method 900 receives a GNSS signal measurement for each signal path received by the GNSS receiver 114 within an environment 100. At operation 904, the method 900 establishes an estimated location $12_{EST}$ for a location $12_A$ of the GNSS receiver 114 within the environment 100. At operation 906, the method 900 generates a plurality of candidate positions 514 about the estimated location $12_{EST}$ for the GNSS receiver 114. Here, each candidate position 514 of the plurality of candidate positions 514 corresponds to a possible actual location $12_A$ of the GNSS receiver 114. At operations 908, the method 900 performs operations 908, 908a-b for each candidate position 514 of the plurality of candidate positions 514. At operation 908a, the method 900 generates a correlation vector 532 representing a pseudorange for the received GNSS signal measurements of each available satellite 20. At operations 908b, the method 900 generates an excess path length vector 526 based on ray launching from the respective candidate positon 514 to a position of each respective available satellite 20. At operation 910, based on all candidate positions 514 of the plurality of candidate positions 514, the method 900 identifies an actual position $12_A$ of the GNSS receiver 114 as the respective candidate actual position 514 where the correlation vector 532 most closely matches the excess path length vector 526.

Figure 10:
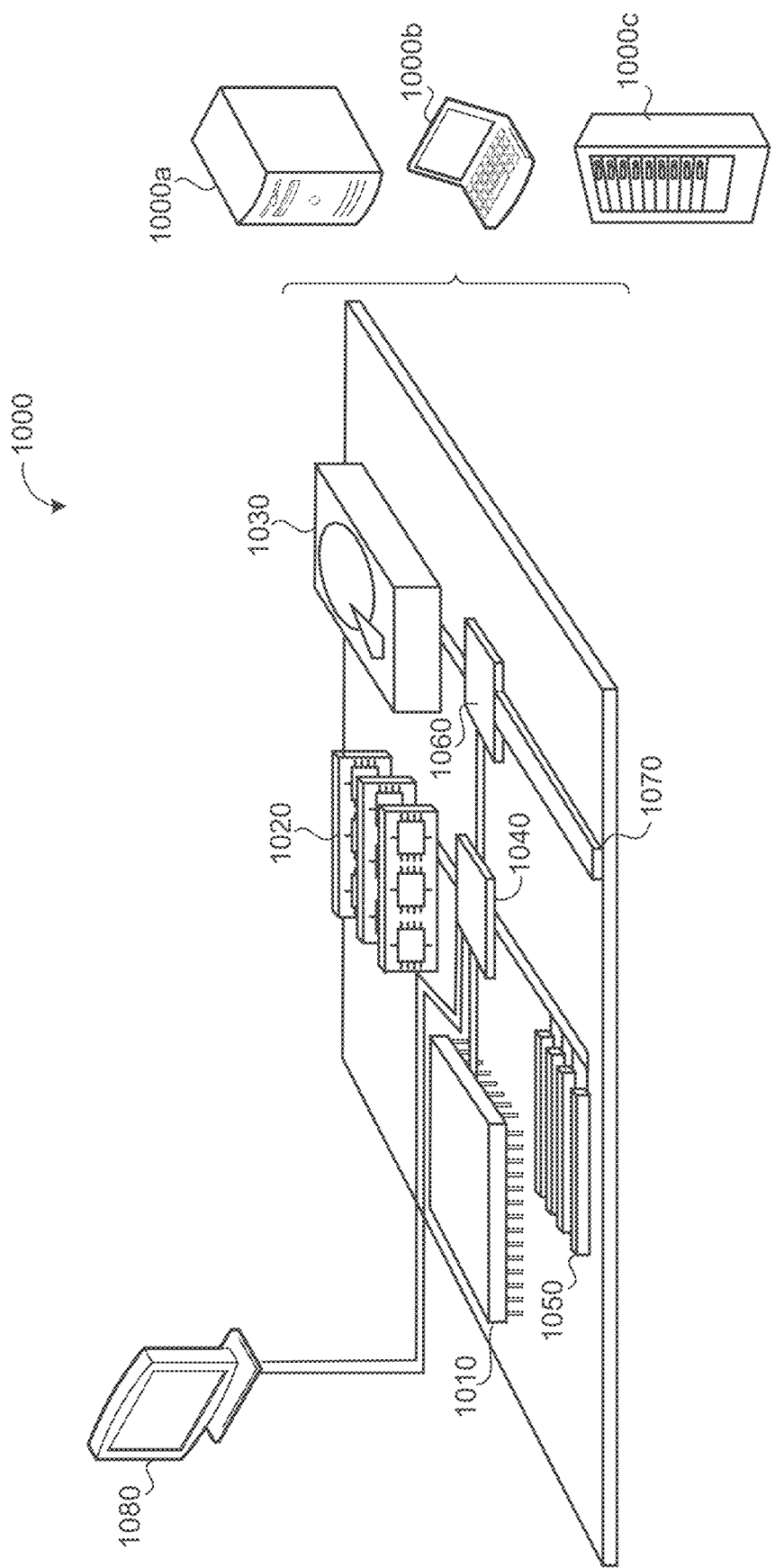
FIG. 10 is a schematic view of an example computing device that may be used to implement the systems and methods described herein.

FIG. 10 is a schematic view of an example computing device 1000 that may be used to implement the systems (e.g., the locational system 120, the signal mapper 200, the precomputer 300, the grid searcher 400, and/or the modeler 500) and methods (e.g., the methods 600, 700, 800,900) described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010 (e.g., data processing hardware), memory 1020 (e.g., memory hardware), a storage device 1030, a high-speed interface/controller 1040 connecting to the memory 1020 and high-speed expansion ports 1050, and a low speed interface/controller 1060 connecting to a low speed bus 1070 and a storage device 1030 Each of the components 1010, 1020, 1030, 1040, 1050, and 1060, are interconnected using various busses, and may be mounted on a common motherboard or in other manners as appropriate The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium in various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above The information carrier is a computer- or machine-readable medium, such as the memory 1020, the storage device 1030, or memory on processor 1010.

The high speed controller 1040 manages bandwidth-intensive operations for the computing device 1000, while the low speed controller 1000 manages lower bandwidth-intensive operations Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or mote input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described herein can be realized in digital electronic and/or optical circuitry, integrated circuitry, specially-designed ASICs (application specific integrated circuits), computer hardware, firmware. software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus anti/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of a Global Navigation Satellite Systems-enabled (GNSS-enabled) device, an estimated location for a GNSS receiver in an environment;
   generating, by the data processing hardware, a plurality of candidate positions about the estimated location for the GNSS receiver, each candidate position of the plurality of candidate positions corresponding to a possible actual location of the GNSS receiver;
   for each available satellite at each candidate position of the plurality of candidate positions, modeling, by the data processing hardware, a plurality of candidate signal paths by ray-launching a raster map of geographical data for the environment, the plurality of candidate signal paths comprising one or more reflected signal paths; and
   at each candidate position of the plurality of candidate positions:
      comparing, by the data processing hardware, the plurality of candidate signal paths modeled for each available satellite at the respective candidate position to measured GNSS signal data from the GNSS receiver, and
      generating, by the data processing hardware, a likelihood that the respective candidate position comprises the actual location of the GNSS receiver based on the comparison of the plurality of candidate signal paths modeled for each available satellite at the respective candidate position to the measured GNSS signal data from the GNSS receiver.

2. The method of claim 1, wherein the raster map comprises a polygonal representation of each building in the environment, the polygonal representation constructed on the GNSS-enabled device.

3. The method of claim 1, further comprising:
   receiving, at the data processing hardware, rasterized geographical data comprising instructions for the GNSS-enabled device, the instructions indicating how to construct polygonal representations of one or more buildings in the environment;
   executing, by the data processing hardware, the instructions to form the raster map, the raster map comprising a polygonal representations of one or more buildings in the environment; and
   storing, by the data processing hardware, the raster map locally on memory hardware of the GNSS-enabled device in communication with the data processing hardware.

4. The method of claim 3, wherein executing the instructions to form the raster map comprise determining facade angles for the one or more buildings based on rasterized geographical data.

5. The method of claim 1, wherein ray-launching the raster map of geographical data for the environment comprises:

launching a ray from the respective candidate position to a polygonal raster representation of a respective structure in the environment;

determining a redirected ray corresponding to a redirection of the ray off of the respective structure based on a facade angle of the polygonal raster representation of the respective structure; and continuing to launch the redirected ray at a redirected angle based on the facade angle of the respective structure.

6. The method of claim 1, wherein modeling the plurality of candidate signal paths comprises, for each candidate signal path of the plurality of candidate signal paths, determining an excess path length for the respective candidate signal path.

7. The method of claim 6, wherein modeling the plurality of candidate signal paths further comprises, for each candidate signal path of the plurality of candidate signal paths, determining a signal attenuation.

8. A Global Navigation Satellite Systems-enabled (GNSS-enabled) device comprising:

data processing hardware; and memory hardware in communication with the data processing hardware, the memory hardware storing instructions that when executed on the data processing hardware cause the data processing hardware to perform operations comprising receiving an estimated location for a GNSS receiver in an environment;

generating a plurality of candidate positions about the estimated location for the GNSS receiver, each candidate position of the plurality of candidate positions corresponding to a possible actual location of the GNSS receiver;

for each available satellite at each candidate position of the plurality of candidate positions, modeling a plurality of candidate signal paths by ray-launching a raster map of geographical data for the environment, the plurality of candidate signal paths comprising one or more reflected signal paths; and at each candidate position of the plurality of candidate positions:

comparing the plurality of candidate signal paths modeled for each available satellite at the respective candidate position to measured GNSS signal data from the GNSS receiver; and generating a likelihood that tire respective candidate position comprises the actual location of the GNSS receiver based on the comparison of the plurality of candidate signal paths modeled for each available satellite at the respective candidate position to the measured GNSS signal data from the GNSS receiver.

9. The device of claim 1, wherein the taster map comprises a polygonal representation of each building in the environment, the polygonal representation constructed on the GNSS-enabled device.

10. The device of claim 1, wherein the operations further comprise:

receiving rasterized geographical data comprising instructions for the GNSS-enabled device, the instructions indicating how to construct polygonal representations of one or more buildings in the environment;

executing the instructions to form the raster map, the raster map comprising a polygonal representations of one or more buildings in the environment; and storing the raster map locally on memory hardware of the GNSS-enabled device in communication with the data processing hardware.

11. The device of claim 10, wherein executing the instructions to form the raster map comprise determining facade angles for the one or more buildings based on rasterized geographical data.

12. The device of claim 8, wherein ray-launching the raster map of geographical data for the environment comprises:

launching a ray from the respective candidate position to a polygonal raster representation of a respective structure in the environment;

determining a redirected ray corresponding to a redirection for the ray off of the respective structure based on a facade angle of the polygonal raster representation of the respective structure; and continuing to launch the redirected ray at a redirected angle based on the facade angle of the respective structure.

13. The device of claim 8. wherein modeling the plurality of candidate signal paths comprises, for each candidate signal path of the plurality of candidate signal paths, determining an excess path length for the respective candidate signal path.

14. The device of claim 13, wherein modeling the plurality of candidate signal paths further comprises, for each candidate signal path of the plurality of candidate signal paths, determining a signal attenuation.

15. A method comprising:

identifying, by data processing hardware, an area having one or more structures likely to reflect a Global Navigation Satellite Systems (GNSS) signal from a satellite;

partitioning, by the data processing hardware, the area into a plurality of locations;

at each location of the plurality of locations for each available satellite:

generating, by the data processing hardware, a plurality of signal paths by ray-launching from the respective location to the respective available satellite, the plurality of signal paths comprising one or more line of sight signal paths and one or more reflected signal paths;

discretizing, by the data processing hardware, all reflected signal paths into one or more azimuth ranges;

for each azimuth range of the one or more azimuth ranges, determining, by the data processing hardware, one or more transition elevations, each transition elevation of the one or more transition elevations corresponding to a degree of elevation that a respective reflected signal path within the respective azimuth range transitions to a line of sight signal, and at each location of the plurality of locations, generating, by the data processing hardware, a signal path representation for the plurality of signal paths, the signal path representation comprising;

the one or more azimuth ranges for all reflected signal paths; and the one or more transition elevations associated with each azimuth range of the one or more azimuth ranges.

16. The method of claim 15, further comprising, for each azimuth range of the one or more azimuth ranges, discretizing, by the data processing hardware, the one or more transition elevations for ail reflected signal paths within the respective azimuth range.

17. The method of claim 15, further comprising:
determining, by the data processing hardware, an excess path length for each reflected signal path,
wherein the signal path representation further comprises the excess path length for each reflected signal path.

18. The method of claim 15, further comprising:
determining, by the data processing hardware, an excess path length for each reflected signal path; and
for each azimuth range, discretizing, by the data processing hardware, the excess path lengths for all reflected signals within the respective azimuth range;
wherein the signal path representation further comprises the discretized excess path lengths.

19. The method of claim 18, wherein discretizing the excess path lengths for all reflected signals comprises generating, using voronoi-based compression, a polygon region representing each discretized unit of excess path lengths.

20. The method of claim 15. further comprising:
receiving, at the data processing hardware, a request comprising a requested position from a GNSS-enabled device; and
identifying, by the data processing hardware, a respective location of the plurality of locations that corresponds to the requested position; and
in response to the request, communicating, by the data processing hardware, the signal path representation for the respective location to the GNSS-enabled device.

21. The method of claim 15, further comprising:
storing, by the data processing hardware, the signal path representation for the plurality of signal paths as a sparse data array; and
compressing, by the data processing hardware, the sparse data array.

22. A system comprising;
data processing hardware; and
memory hardware in communication with the data processing hardware, the memory hardware storing instructions that when executed on the data processing hardware cause the data processing hardware to perform operations comprising:
identifying an area having one or more structures likely to reflect a Global Navigation Satellite Systems (GNSS) signal from a satellite;
partitioning the area into a plurality of locations;
at each location of the plurality of locations for each available satellite:
generating a plurality of signal paths by ray-launching from the respective location to the respective available satellite, the plurality of signal paths comprising one or more line of sight signal paths and one or more reflected signal paths;
discretizing all reflected signal paths into one or more azimuth ranges; and
for each azimuth range of the one or more azimuth ranges, determining one or more transition elevations, each transition elevation of the one or more transition elevations corresponding to a degree of elevation that a respective reflected signal path within the respective azimuth range transitions to a line of sight signal; and
at each location of the plurality of locations, generating a signal path representation for the plurality of signal paths, the signal path representation comprising:
the one or more azimuth ranges for all reflected signal paths; and
the one or more transition elevations associated with each azimuth range of the one or more azimuth ranges.

23. The system of claim 22, wherein the operations further comprise, for each azimuth range of the one or more azimuth ranges, discretizing the one or more transition elevations for all reflected signal paths within the respective azimuth range.

24. The system of claim 22, wherein the operations further comprise:
determining an excess path length for each reflected signal path,
wherein the signal path representation further comprises the excess path length for each reflected signal path.

25. The system of claim 22, wherein the operations further comprise:
determining an excess path length for each reflected signal path; and
for each azimuth range, discretizing the excess path lengths for all reflected signals within the respective azimuth range,
wherein the signal path representation further comprises the discretized excess path lengths.

26. The system of claim 25, wherein discretizing the excess path lengths for all reflected signals comprises generating, using voronoi-based compression, a polygon region representing each discretized unit of excess path lengths.

27. The system of claim 22, wherein the operations further comprising:
receiving a request comprising a requested position from a GNSS-enabled device; and
identifying a respective location of the plurality of locations that corresponds to the requested position; and
in response to the request, communicating the signal path representation for the respective location to the GNSS-enabled device.

28. The system of claim 22, wherein the operations further comprise:
storing the signal path representation for the plurality of signal paths as a sparse data array; and
compressing the sparse data array.

* * * * *